US012207228B2

(12) United States Patent
Kim

(10) Patent No.: US 12,207,228 B2
(45) Date of Patent: Jan. 21, 2025

(54) METHOD AND APPARATUS FOR TERMINAL TO DETERMINE REFERENCE PAGING CYCLE IN MOBILE WIRELESS COMMUNICATION SYSTEM

(71) Applicants: BLACKPIN INC., Seoul (KR); Soenghun Kim, Hanam-si (KR)

(72) Inventor: Soenghun Kim, Hanam-si (KR)

(73) Assignees: Blackpin Inc., Seoul (KR); Soenghun Kim, Hanam-si (KR)

( * ) Notice: Subject to any disclaimer, the term of this patent is extended or adjusted under 35 U.S.C. 154(b) by 338 days.

(21) Appl. No.: 17/888,476

(22) Filed: Aug. 16, 2022

(65) Prior Publication Data

US 2023/0117028 A1 Apr. 20, 2023

(51) Int. Cl.
*H04W 4/40* (2018.01)
*H04W 68/00* (2009.01)
*H04W 76/28* (2018.01)

(52) U.S. Cl.
CPC ......... *H04W 68/005* (2013.01); *H04W 76/28* (2018.02)

(58) Field of Classification Search
None
See application file for complete search history.

(56) References Cited

FOREIGN PATENT DOCUMENTS

| | | | |
|---|---|---|---|
| JP | 2014-222883 | 11/2014 | |
| JP | 2019-507975 | 3/2019 | |
| KR | 10-2018- 0029236 | 3/2018 | |
| KR | 10-2018- 0103104 | 9/2018 | |
| KR | 10-2020-0020611 | 2/2020 | |
| KR | I 0-2020-0020611 | 2/2020 | |
| WO | WO-2022033293 A1 * | 2/2022 | ............. H04W 4/40 |

OTHER PUBLICATIONS

Notice of Allowance in Korean Appln. No. 10-2021-0138362, mailed on Mar. 22, 2023, 4 pages (with English translation).
Office Action in Korean Appln. No. 10-2021-0138362, mailed on Jan. 13, 2023, 4 pages (with English translation).
Office Action in Korean Appln. No. 10-2021-0138362, mailed on Jul. 22, 2022, 11 pages (with English translation).
ETSI MCC, "Report of 3GPP TSG RAN WG2 meeting #114-e, Online," R2-2106901, 3GPP TSG-RAN WG2 meeting #115-e, May 2021, 295 pages.
ETSI MCC, "Report of 3GPP TSG RAN WG2 meeting #115-e, Online," R2-2109301, 3GPP TSG-RAN WG2 meeting #116-e, Aug. 2021, 361 pages.
International Search Report and Written Opinion in International Appln. No. PCT/KR2022/014326, mailed on Jan. 10, 2023, 22 pages (with English translation).

* cited by examiner

*Primary Examiner* — Gary Lafontant
(74) *Attorney, Agent, or Firm* — Fish & Richardson P.C.

(57) ABSTRACT

A method and apparatus for monitoring paging in a mobile communication system are provided. Method for monitoring paging includes receiving a first message including first paging cycle and second paging cycle from the AMF, receiving a second message including third paging cycle and fourth paging cycle from the base station, receiving a system information including an information related to the support of extended DRX, determining a reference DRX cycle and monitoring paging occasion based on the reference DRX cycle.

5 Claims, 10 Drawing Sheets

METHOD AND APPARATUS FOR TERMINAL TO DETERMINE REFERENCE PAGING CYCLE IN MOBILE WIRELESS COMMUNICATION SYSTEM

CROSS-REFERENCE TO RELATED APPLICATION

This application claims priority to and the benefit of Korean Patent Application No. 10-2021-0138362, filed on Oct. 18, 2021, the disclosure of which is incorporated herein by reference in its entirety.

BACKGROUND

Technical Field

The present disclosure relates to a method and apparatus for a terminal with reduced capability in a wireless communication system to obtain system information and access a New Radio cell.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Various attempts are being made to apply the 5G communication system to the IoT network. For example, 5G communication such as sensor network, machine to machine communication (M2M), and machine type communication (MTC) is being implemented by techniques such as beam forming, MIMO, and array antenna.

The terminal performing the MTC communication requires only limited performance compared to a general smart phone, and a terminal having only reduced capability for MTC communication is referred to as a RedCap UE. In order to efficiently support RedCap UE in a mobile communication system, there is a need to introduce a new technology to an existing mobile communication system.

SUMMARY

Aspects of the present disclosure are to address the various methods of monitoring paging in mobile communication system. Accordingly, an aspect of the present disclosure is to provide a method and an apparatus for receiving a first message including first paging cycle and second paging cycle from the AMF, receiving a second message including third paging cycle and fourth paging cycle from the base station, receiving a system information including an information related to the support of extended DRX, determining a reference DRX cycle and monitoring paging occasion based on the reference DRX cycle.

DETAILED DESCRIPTION

Figure 1A:
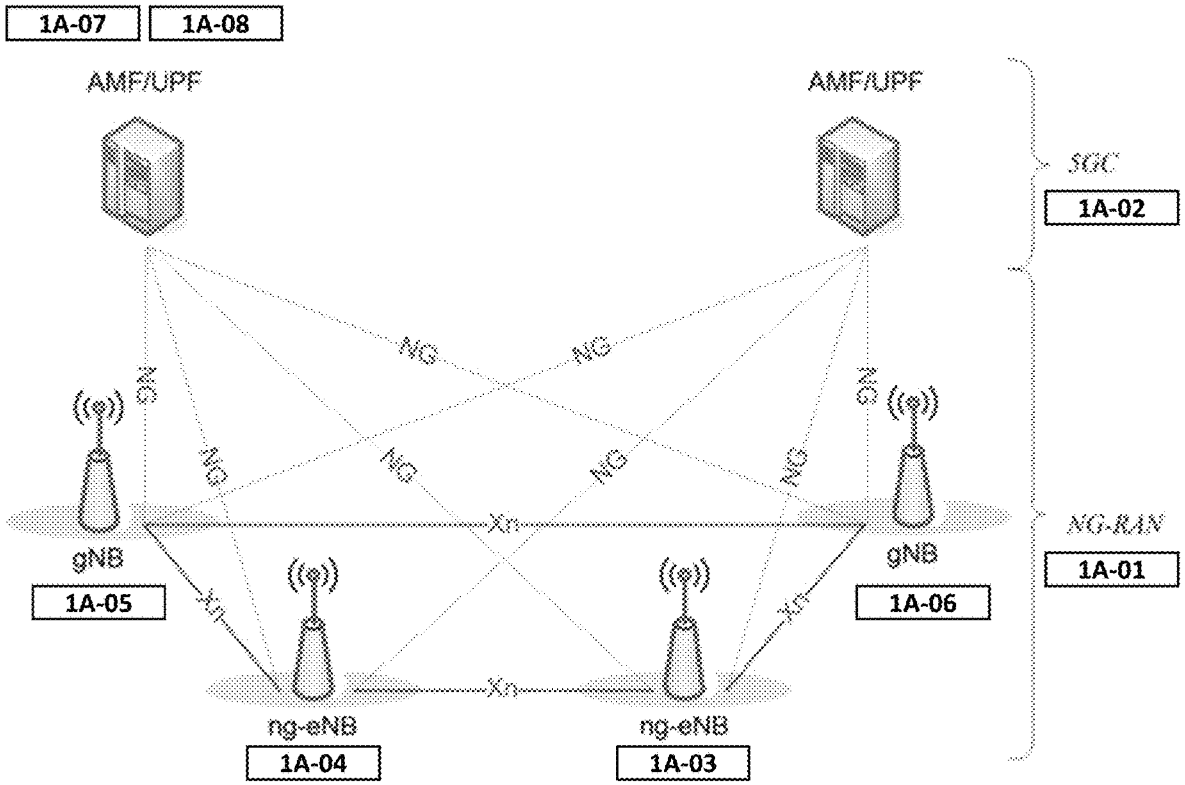
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
|---|---|
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |

TABLE 1-continued

| Acronym | Full name |
|---|---|
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |

TABLE 1-continued

| Acronym | Full name |
|---|---|
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |
| CRP | Cell Reselection Priority |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrierfrequency | Center frequency of the cell. |
| Cell | Combination of downlink and optionally uplink resources. The linking between the carrier frequency of the downlink resources and the carrier frequency of the uplink resources is indicated in the system information transmitted on the downlink resources. |
| CellGroup | in dual connectivity, a group of serving cells associated with either the MeNB or the SeNB. |

TABLE 2-continued

| Terminology | Definition |
|---|---|
| Cellreselection | A process to find a better suitable cell than the current serving cell based on the system information received in the current serving cell |
| Cellselection | A process to find a suitable cell either blindly or based on the stored information |
| Dedicatedsignalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequencylayer | set of cells with the same carrier frequency. |
| Globalcellidentity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Informationelement | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logicalchannel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| MasterCellGroup | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCPentityreestablishment | The process triggered upon upper layer request. It includes the initialization of state variables, reset of header compression and manipulating of stored PDCP SDUs and PDCP PDUs. The details can be found in 5.1.2 of 38.323 |
| PDCPsuspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN IDCheck | the process that checks whether a PLMN ID is the RPLMN identity or an EPLMN identity of the UE. |
| PrimaryCell | The MCG cell, operating on the primary frequency, in which the UE either performs the initial connection establishment procedure or initiates the connection re-establishment procedure. |
| PrimarySCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCHSCell | a Secondary Cell configured with PUCCH. |
| RadioBearer | Logical path between a PDCP entity and upper layer (i.e. SDAP entity or RRC) |
| RLCbearer | RLC and MAC logical channel configuration of a radio bearer in one cell group. |

TABLE 2-continued

| Terminology | Definition |
|---|---|
| RLCbearerconfiguration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| SpecialCell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitablecell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UEInactiveASContext | UE Inactive AS Context is stored when the connection is suspended and restored when the connection is resumed. It includes information below,<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:<br>parameters within ReconfigurationWithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, a terminal with reduced capability and RedCap UE may be used in the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
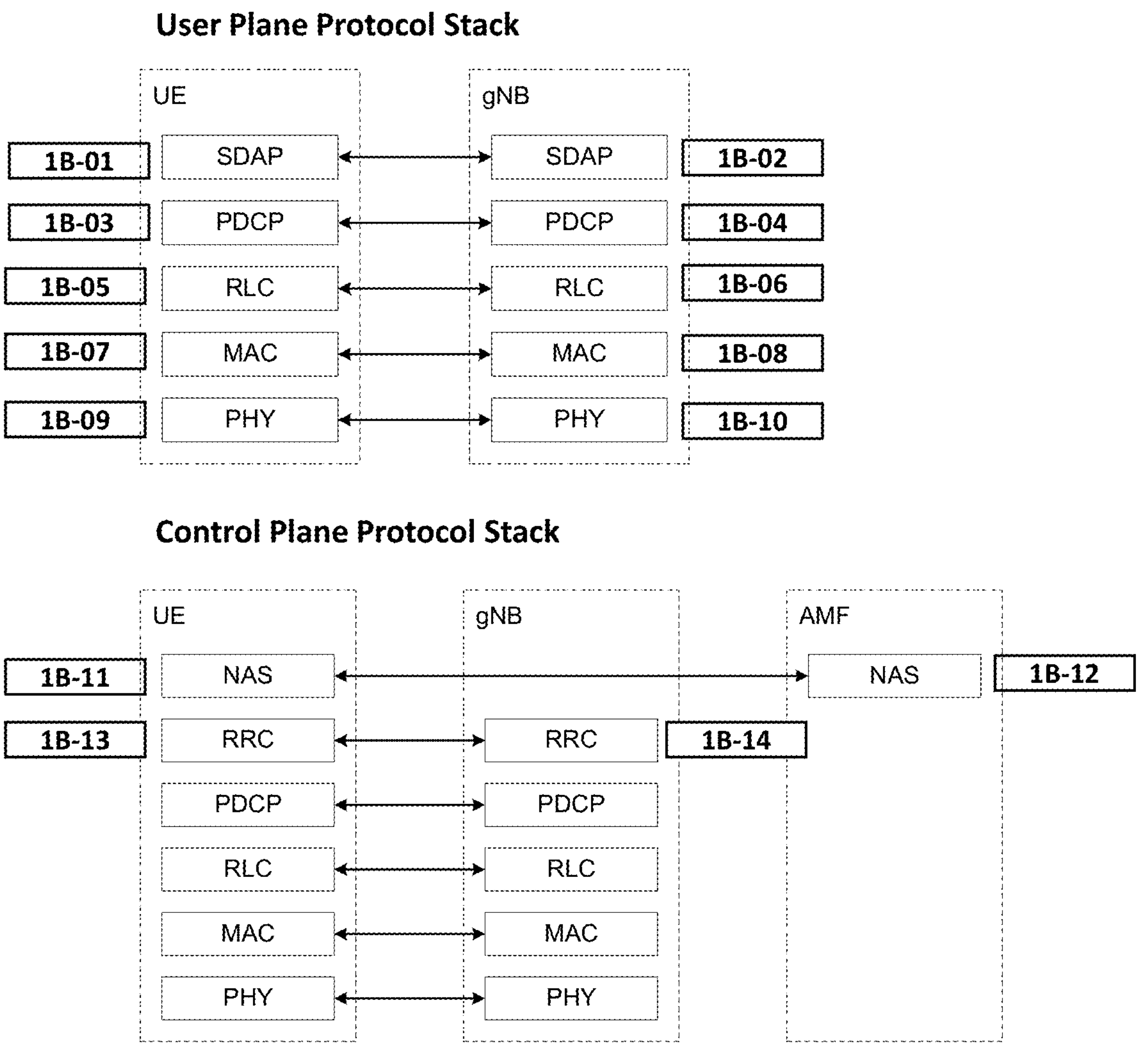
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

a transmission/reception speed of several tens of Mbps, and two or less Rx processing units.

The present invention provides a method and apparatus for a RedCap UE to access a cell supporting RedCap, receive system information, and perform necessary operations. In particular, the terminal applies search space 0 (Search Space 0, hereinafter SS #0) and control resource set 0 (Control Resource Set 0, hereinafter CORESET #0) in the initial bandwidth part (IBWP) to obtain system information.

Figure 2A:
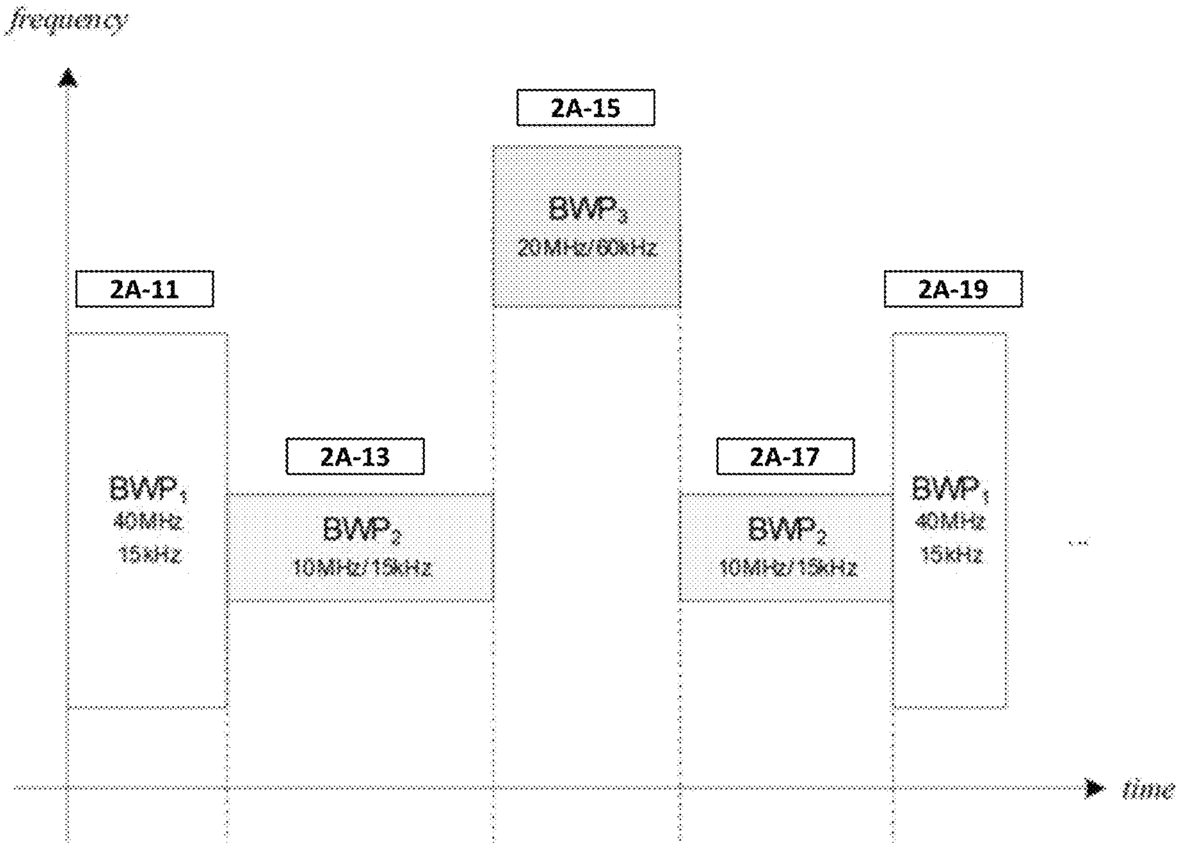
FIG. 2A is a diagram illustrating an example of a bandwidth part.

FIG. 2A is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 2A describes a scenario where 3 different BWPs are configured:

BWP1 with a width of 40 MHz and subcarrier spacing of 15 kHz; 2A-11 or 2A-19

BWP2 with a width of 10 MHz and subcarrier spacing of 15 kHz; 2A-13 or 2A-17

BWP3 with a width of 20 MHz and subcarrier spacing of 60 kHz. 2A-15

Figure 2B:
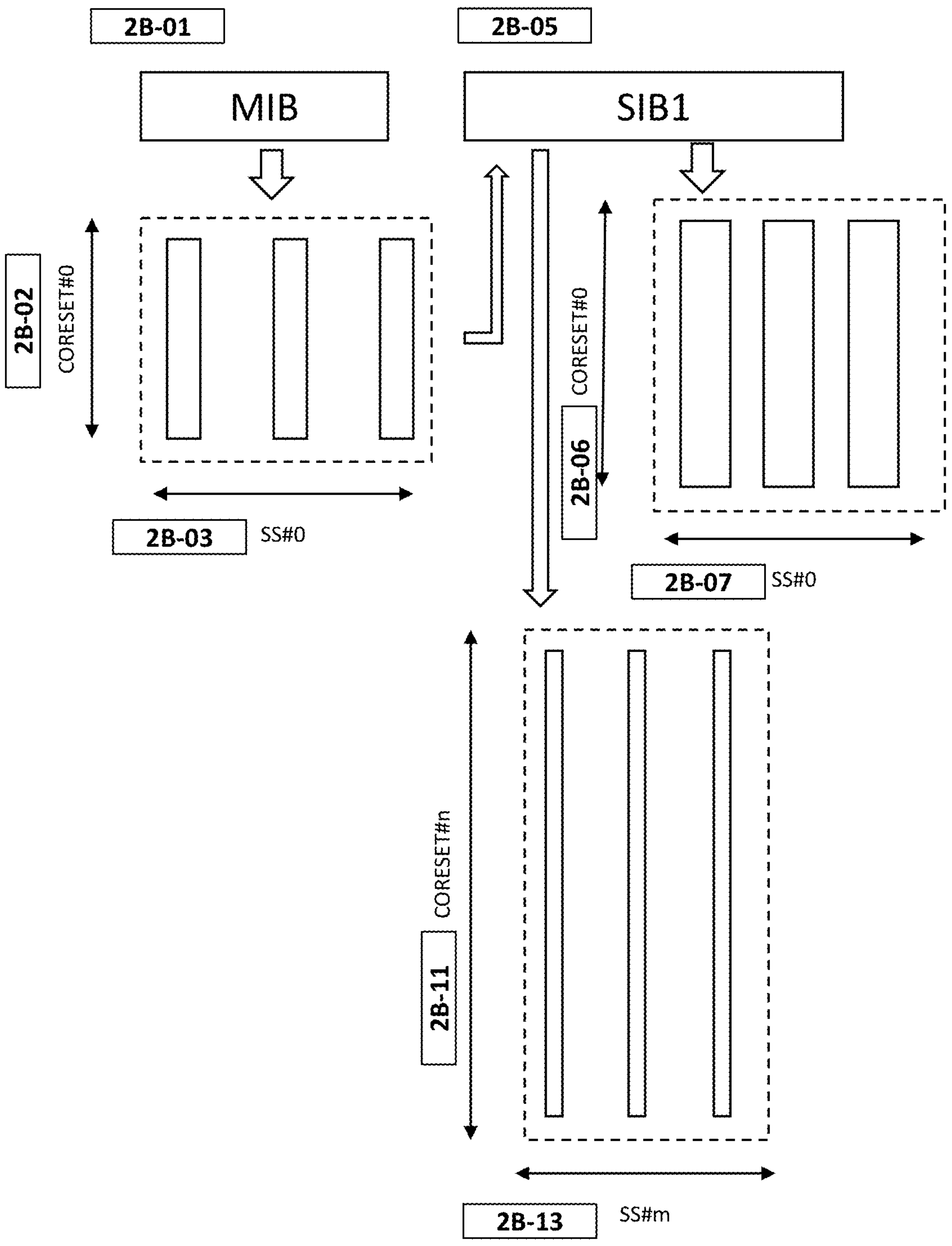
FIG. 2B is a diagram illustrating an example of a search space and a control resource set.

FIG. 2B is a diagram illustrating an example of a search space and a control resource set.

A plurality of SSs may be configured in one BWP. The UE monitors PDCCH candidates according to the SS configu-

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

A reduced capability UE or RedCap UE has lower performance than a general UE and is used in limited scenarios such as IOT. Compared to a typical terminal having a bandwidth of 100 MHz, a transmission/reception speed of several Gbps, and four or more Rx processing units (Rx branches), RedCap terminals have a bandwidth of 20 MHz, ration of the currently active BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI state information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 2B-01, the UE recognizes CORESET #0 2B-02 and SS #0 2B-03 for receiving SIB1 using predetermined information included in the MIB. The UE receives SIB1 2B-05 through CORESET #0 2B-02 and SS #0 2B-03. In SIB1, information constituting CORESET #0 2B-06 and SS #0 2B-07 and information constituting another CORESET, for example, CORESET #n 2B-11 and SS #m 2B-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 2B-02 configured in MIB and CORESET #0 2B-06 configured in SIB1 may be different from each other, and the former is called a first CORESET #0 and the latter is called a second CORESET #0. SS #0 2B-03 configured in MIB and SS #0 2B-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

Figure 3A:
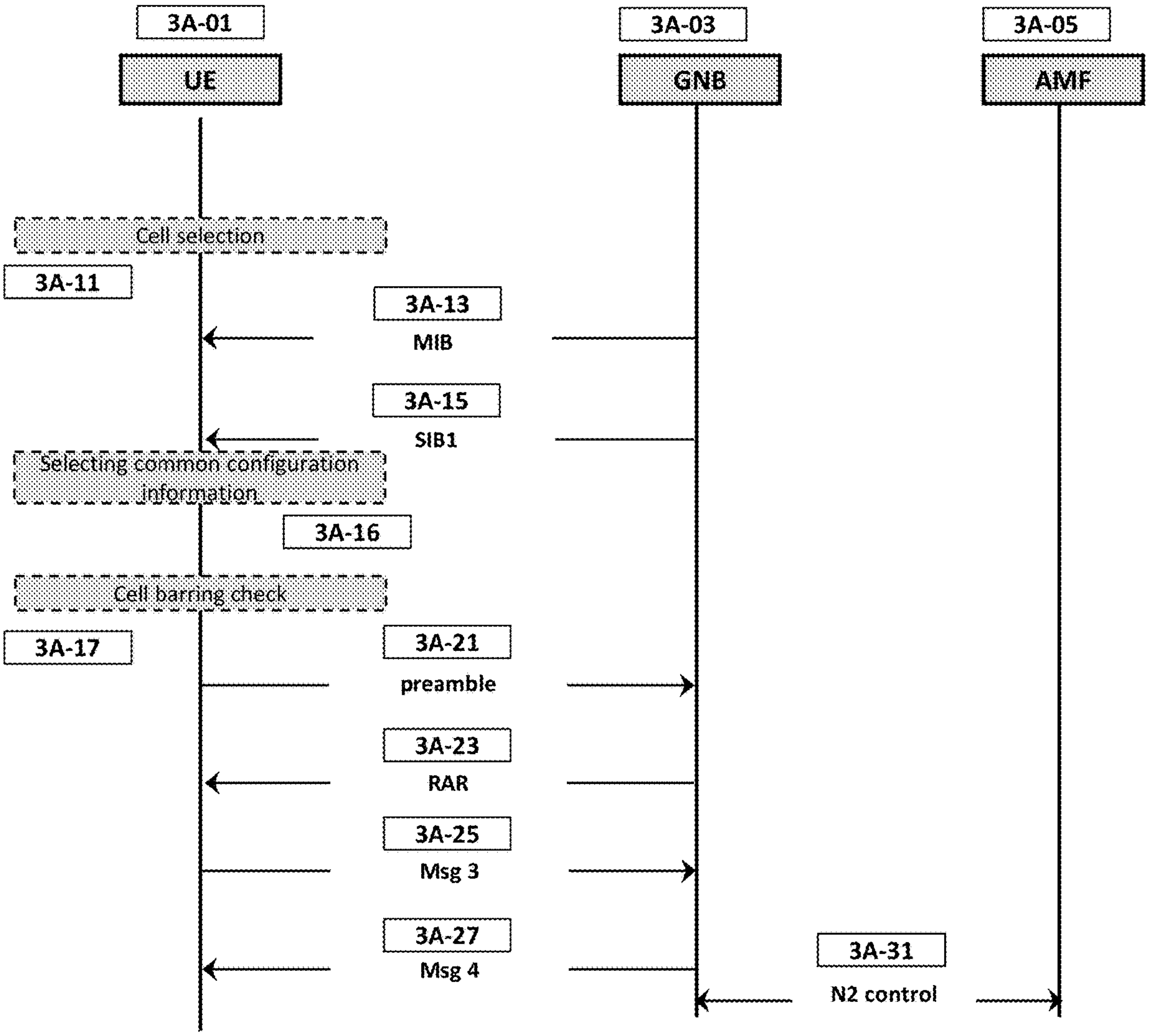
FIG. 3A is a diagram illustrating operations of a terminal and a base station according to an embodiment of the present invention.

FIG. 3A is a diagram illustrating operations of a terminal and a base station according to an embodiment of the present disclosure.

In a network consisting of a RedCap UE 3A-01, a base station 3A-03 and an AMF 3A-05, the RedCap UE receives system information, determines whether to bar a cell, performs cell reselection, monitors a paging message, selects and applies cell common configuration information and transmits and receives RRC control messages.

In step 3A-11, the RedCap UE camps on a cell managed by the base station by performing cell selection or cell reselection. The RedCap UE selects a cell having a good reception signal from among cells of the highest priority frequency in consideration of cell reselection priority and the like.

In step 3A-13, the RedCap UE receives the MIB in the selected cell.

The MIB includes controlResourceSetZero, which is a 4-bit index indicating the configuration of the first CORESET #0, and controlResourceSetZero, which is a 4-bit index, indicating the configuration of the first SS #0. The UE receives SIB1 by applying the frequency domain and time pattern indicated by the first CORESET #0 and the first SS #0. The MIB includes cellBarred, which is 1-bit information indicating whether or not the cell is barred. cellBarred indicates either barred or notBarred. The UE uses cellBarred to determine whether to bar the cell.

The MIB includes a first intraFreqReselection that is 1-bit information for controlling intra-frequency cell reselection. The first intraFreqReselection is defined as Enumerated {allowed, notAllowed}. Also called IFRI_MIB.

In steps 3A-15, the RedCap UE receives SIB1. The RedCap UE stores the acquired SIB1. SIB1 includes ServingCellConfigCommon, which is common configuration information of a serving cell, and a second intraFreqReselection. The second intraFreqReselection is defined as enumerated with one of Allowed and notAllowed. It is also called IFRI_SIB.

In step 3A-16, the RedCap UE selects one of a plurality of common configuration information included in ServingCellConfigCommon.

The servingCellConfigCommon of SIB1 includes the following information.

TABLE 4

| | |
|---|---|
| DownlinkConfigCommon | This is a common downlink configuration of the serving cell. It consists of subfields such as frequencyInfoDL, initialDownlinkBWP, bcch-Config, and pcch-Config. |
| frequencyInfoDL | It is a basic parameter of a downlink carrier. It consists of subfields such as a frequency band list and carrier bandwidth for each SCS. |
| initialDownlinkBWP | This is the configuration of the second downlink IBWP. It consists of subfields such as BWP, PDCCH-ConfigCommon, and PDSCH-ConfigCommon. The first IBWP has a frequency domain corresponding to the first CORESET#0 of the MIB and has subcarrier spacing indicated by the MIB. The first IBWP is the IBWP indicated by the MIB and used for receiving SIB1, the second IBWP is the IBWP indicated by the SIB1 and used for receiving the SIB2, paging, random access response message, and the like. |
| BWP | It is IE that configures general parameters of BWP. It consists of subfields such as locationAndBandwidth indicating the bandwidth and location of the BWP, and subcarrierSpacing indicating the SCS of the BWP. |

TABLE 4-continued

| | |
|---|---|
| PDCCH-ConfigCommon | It is the cell-specific PDCCH parameters of the BWP. It consists of subfields such as controlResourceSetZero, commonControlResourceSet, searchSpaceZero, commonSearchSpaceList, searchSpaceOtherSystemInformation, pagingSearchSpace, and ra-SearchSpace. |
| controlResourceSetZero | It is defined as an integer between 0 and 15. Indicates one of the predefined CORESET#0 configurations. The controlResourceSetZero included in the MIB corresponds to the first CORESET#0, and the controlResourceSetZero included in the PDCCH-ConfigCommon of the servingCellConfigCommon of SIB1 corresponds to the second CORESET#0. |
| searchSpaceZero | It is defined as an integer between 0 and 15. Indicates one of the predefined SS#0 configurations. The searchSpaceZero included in the MIB corresponds to the first SS#0, and the controlResourceSetZero included in the PDCCH-ConfigCommon of the servingCellConfigCommon of SIB1 corresponds to the second SS#0. |
| commonControlResourceSet | A common CORESET defined by ControlResourceSet IE. Defines an additional CORESET that can be used for paging reception, random access response reception, system information reception, etc. |
| commonSearchSpaceList | List of common SSs. The common SS may be used for paging reception, random access response reception, system information reception, and the like. |
| searchSpaceOtherSystemInformation | Defined by the SS identifier IE. If it is 0, the second SS#0 is indicated, and if it is a value other than 0, one of the SSs defined in commonSearchSpaceList is indicated. |
| pagingSearchSpace | Defined by the SS identifier IE. If it is 0, the second SS#0 is indicated, and if it is a value other than 0, one of the SSs defined in commonSearchSpaceList is indicated. |
| ra-SearchSpace | Defined by the SS identifier IE. If it is 0, the second SS#0 is indicated. If it is a value other than 0, one of the SSs defined in the commonSearchSpaceList is indicated. |
| PDSCH-ConfigCommon | Cell-specific PDSCH parameters of this BWP. It consists of a pdsch-TimeDomainAllocationList. The pdsch-TimeDomainAllocationList is a list composed of a plurality of pdsch-TimeDomainAllocations. |
| pdsch-TimeDomainAllocation | A time domain relationship between the PDCCH and the PDSCH. It consists of subfields such as K0 and startSymbolAndLength. K0 is the slot offset between the DCI and the scheduled PDSCH. startSymbolAndLength is an index indicating a valid start symbol and length combination. |
| pcch-Config | Configuration related to paging. It consists of sub-fields such as the base station paging period, PF-related parameters, and PO-related parameters. |
| bcch-config | It is a configuration related to system information. It consists of subfields such as modificationPeriodCoeff indicating the length of the modification period. |
| UplinkConfigCommonSIB | This is a common uplink configuration of the serving cell. It consists of subfields such as frequencyInfoUL, initialUplinkBWP, and timeAlignmentTimerCommon. |
| frequencyInfoUL | It is a basic parameter of the uplink carrier. It consists of subfields such as a frequency band list and carrier bandwidth for each SCS. |
| initialUplinkBWP | This is the configuration of the second uplink IBWP. It consists of subfields such as BWP, rach-ConfigCommon, pusch-ConfigCommon, and pucch-ConfigCommon. |
| rach-ConfigCommon | This is the cell-specific random access parameter of the BWP. It consists of subfields such as prach-ConfigurationIndex, msg1-Frequency Start, preambleReceivedTargetPower, ra-ResponseWindow, preambleTransMax, msg1-SubcarrierSpacing, rsrp-ThresholdSSB, and ra-ContentionResolutionTimer. |

TABLE 4-continued

| | |
|---|---|
| prach-ConfigurationIndex | PRACH configuration index. One PRACH configuration corresponds to pattern information on a PRACH transmission opportunity in the time domain (information indicating in which symbol in which slot of which radio frame PRACH transmission is possible), a transmission format of a preamble, and the like. |
| msg1-FrequencyStart | The offset from PRB0 of the lowest PRACH transmission opportunity. Information indicating a PRACH transmission resource in the frequency domain. PRB0 is the lowest frequency PRB among PRBs of the corresponding carrier. |
| preambleReceivedTargetPower | This is the target power level of the network receiving end. It is a parameter related to transmission power control during the random access procedure. |
| ra-ResponseWindow | The length of the random access response window expressed in the number of slots. |
| preambleTransMax | The maximum number of random access preamble transmissions |
| msg1-SubcarrierSpacing | It is PRACH's SCS. It is commonly applied to general terminals and RedCap UEs. |
| rsrp-ThresholdSSB | SSB selection criteria. The UE performs random access by selecting a preamble corresponding to the selected SSB. |
| ra-ContentionResolutionTimer | This is the initial value of the contention resolution timer. Indicates the number of subframes. |
| pusch-ConfigCommon | Cell-specific PUSCH parameters of this BWP. It consists of subfields like pusch-TimeDomainAllocationList. The pusch-TimeDomainAllocationList is a list composed of a plurality of pusch-TimeDomainAllocations. |
| pusch-TimeDomainAllocation | A time domain relationship between the PDCCH and the PUSCH. It consists of subfields such as K2 and startSymbolAndLength. K2 is the slot offset between the DCI and the scheduled PUSCH. startSymbolAndLength is an index indicating a valid combination of start symbol and length. |
| pucch-ConfigCommon | This is the cell-specific PUCCH parameter of the BWP. It consists of subfields such as pucch-ResourceCommon and p0-norminal. |
| pucch-ResourceCommon | It is an index corresponding to a cell-specific PUCCH resource parameters. One index corresponds to a PUCCH format, a PUCCH time period, a PUCCH frequency period, a PUCCH code, and the like. |
| p0-norminal | This is a power offset applied during PUCCH transmission. Defined as an integer between −202 and 24 in increments of 2. The unit is dBm. |
| timeAlignmentTimerCommon | This is a timer applied when the UE performs random access for RRC connection establishment procedure and RRC connection re-establishment procedure. When the UE receives the RAR, it starts the timer, and stops the timer when contention fails. |
| tdd-UL-DL-ConfigurationCommon | Cell specific TDD UL/DL configuration. It consists of subfields such as referenceSubcarrierSpacing, pattern1, and pattern2. |
| referenceSubcarrierSpacing | This is the reference SCS used to determine the time domain boundary in the UL-DL pattern. |
| pattern1, pattern2 | TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols. |
| dl-UL-TransmissionPeriodicity | Indicates the period of the DL-UL pattern. |
| nrofDownlinkSlots | Indicates the number of consecutive full DL slots in each DL-UL pattern. |
| nrofDownlinkSymbols | Indicates the number of consecutive DL symbols from the beginning of the slot following the last full DL slot. |
| nrofUplinkSlots | Indicates the number of consecutive full UL slots in each DL-UL pattern. |

TABLE 4-continued

| | |
|---|---|
| nrofUplinkSymbols | Indicates the number of consecutive UL symbols at the last time point of a slot preceding the first full UL slot |

ServingCellConfigCommon may also include the following information for RedCap UE.

TABLE 5

| | |
|---|---|
| controlResourceSetZero_RedCap | It is defined as an integer between 0 and 15. Indicates one of the predefined CORESET#0 configurations. It corresponds to the third CORESET #0. |
| searchSpaceZero_RedCap | It is defined as an integer between 0 and 15. Indicates one of the predefined SS#0 configurations. It corresponds to the third SS#0. |
| searchSpaceOtherSystemInformation_RedCap | Defined by the SS identifier IE. If it is 0, the third SS#0 is indicateed, if not 0, one of the SSs defined in commonSearchSpaceList is indicateed. |
| ra-SearchSpace_RedCap | Defined by the SS identifier IE. If it is 0, the third SS#0 is indicateed, if not 0, one of the SSs defined in commonSearchSpaceList is indicateed. . |
| prach-ConfigurationIndex_RedCap | PRACH configuration index for RedCap. |
| msg1-FrequencyStart_RedCap | PRACH transmission resource information on the frequency domain for RedCap |
| preambleReceivedTargetPower_RedCap | The target power level of the network receiver for RedCap. |
| ra-ResponseWindow_RedCap | Length of the random access response window for RedCap. |
| preambleTransMax_RedCap | Maximum number of random access preamble transmissions for RedCap |
| rsrp-ThresholdSSB_RedCap | SSB selection criteria for RedCap. |
| ra-ContentionResolutionTimer_RedCap | Initial value of the contention resolution timer for RedCap. |
| intraFreqReselection_RedCap | Controls cell selection/reselection within the frequency of RedCap UE when the highest-priority cell is barred. It is 1-bit information and is defined as Enumerated {Allowed, notAllowed}. Also called IFRI_SIB1. |

IFRI_MIB is defined to be present mandatorily and IFRI_SIB1 is defined to be present optionally. This is to ensure backward compatibility of SIB1.

Instead of defining IEs for RedCap UEs in units of individual IEs, it is also possible to define configuration information related to RedCap UEs in units of IE sets as follows.

ServingCellConfigCommon of SIB1 includes downlink IBWP configuration information and uplink IBWP configuration information.

Downlink IBWP configuration information includes PDCCH-ConfigCommon and PDCCH-ConfigCommon2. PDCCH-ConfigCommon is used by general terminals and RedCap UEs, and PDCCH-ConfigCommon2 is used by RedCap UEs. RedCap UE uses PDCCH-ConfigCommon when only PDCCH-ConfigCommon is included in downlink IBWP configuration information and uses PDCCH-ConfigCommon2 when both PDCCH-ConfigCommon and PDCCH-ConfigCommon2 are included.

PDCCH-ConfigCommon includes controlResourceSetZero, commonControlResourceSet, searchSpaceZero, commonSearchSpaceList, searchSpaceOtherSystemInformation, pagingSearchSpace, and ra-SearchSpace. PDCCH-ConfigCommon2 includes controlResourceSetZero_RedCap, commonControlResourceSet_RedCap, searchSpaceZero_RedCap, commonSearchSpaceList_RedCap, ra-SearchSpace_RedCap.

RedCap UE uses controlResourceSetZero and searchSpaceZero of PDCCH-ConfigCommon if controlResourceSetZero_RedCap and searchSpaceZero_RedCap are not included in PDCCH-ConfigCommon2. That is, it is considered that the same value as the second SS #0 is configured for the third SS #0 and the same value as the second CORESET #0 is configured for the third CORESET #0.

The RedCap UE uses the values indicated in the MIB when controlResourceSetZero_RedCap and searchSpaceZero_RedCap are not included in PDCCH-ConfigCommon2 and controlResourceSetZero and searchSpaceZero are not included in PDCCH-ConfigCommon. That is, it is considered that the same value as the first SS #0 is configured for the third SS #0 and the same value as the first CORESET #0 is configured for the third CORESET #0.

RedCap UE uses ra-SearchSpace of PDCCH-ConfigCommon if ra-SearchSpace_RedCap is not included in PDCCH-ConfigCommon2. That is, it is considered that the same value as ra-SearchSpace is set as ra-SearchSpace_RedCap. The RedCap UE performs a random access procedure by applying the third SS #0 and the third CORESET #0.

The uplink IBWP configuration information includes PUCCH-ConfigCommon and PUCCH-ConfigCommon2. PUCCH-ConfigCommon is used by general UEs and RedCap UEs, and PUCCH-ConfigCommon2 is used by RedCap UEs. RedCap UE uses PUCCH-ConfigCommon when only PUCCH-ConfigCommon is included in uplink IBWP configuration information, and uses PUCCH-ConfigCommon2 when both PUCCH-ConfigCommon and PUCCH-ConfigCommon2 are included.

PUCCH-ConfigCommon2 is used by RedCap UE. PUCCH-ConfigCommon contains pusch-TimeDomainAllocationList. PUCCH-ConfigCommon2 contains pusch-TimeDomainAllocationList_RedCap.

The uplink IBWP configuration information includes RACH-ConfigCommon and RACH-ConfigCommon2. RACH-ConfigCommon is used by general terminals and RedCap UEs, and RACH-ConfigCommon2 are used by RedCap UEs. RedCap UE uses RACH-ConfigCommon when only RACH-ConfigCommon is included in uplink IBWP configuration information, and uses RACH-ConfigCommon2 when both RACH-ConfigCommon and RACH-ConfigCommon2 are included.

RACH-ConfigCommon includes prach-ConfigurationIndex, msg1-FrequencyStart, preambleReceivedTargetPower, ra-ResponseWindow, preambleTransMax, msg1-SubcarrierSpacing, rsrp-ThresholdSSB, and ra-ContentionResolutionTimer.

RACH-ConfigCommon2 includes prach-ConfigurationIndex_RedCap, msg1-FrequencyStart_RedCap, preambleReceivedTargetPower_RedCap, ra-ResponseWindow_RedCap, preambleTransMax_RedCap, rsrp-ThresholdSSB_RedCap, ra-ContentionResolutionTimer_RedCap. msg1-SubcarrierSpacing included in RACH-ConfigCommon is applied to both normal UEs and RedCap UEs. In other words, the RedCap UE applies msg1-FrequencyStart included in RACH-ConfigCommon2 and msg1-SubcarrierSpacing included in RACH-ConfigCommon when applying msg1 frequency-related information.

If RACH-ConfigCommon2 does not contain prach-ConfigurationIndex_RedCap, msg1-FrequencyStart_RedCap, preambleReceivedTargetPower_RedCap, ra-ResponseWindow_RedCap, preambleTransMax_RedCap, msg1-SubcarrierSpacing_RedCap, rsrp-ThresholdSSB_RedCap, ra-ContentionResolutionTimer_RedCap, RedCap UE uses a same values of prach-ConfigurationIndex, a same values of msg1-FrequencyStart, a same values of preambleReceivedTargetPower, a same values of ra-ResponseWindow, a same values of preambleTransMax, a same values of msg1-SubcarrierSpacing, a same values of rsrp-ThresholdSSB, a same values of ra-ContentionResolutionTimer in RACH-ConfigCommon respectively.

In another method, the ServingCellConfigCommon of SIB1 includes the first downlink IBWP configuration information, the first uplink IBWP configuration information, the second downlink IBWP configuration information, the second uplink IBWP configuration information, and tdd-UL-DL-ConfigurationCommon. The first downlink IBWP configuration information and the first uplink IBWP configuration information are information for a terminal with general capability, and the second downlink IBWP configuration information and the second uplink IBWP configuration information are information for a RedCap UE. tdd-UL-DL-ConfigurationCommon is information that is commonly applied to a UE with general capability and a RedCap UE.

The first uplink IBWP configuration information includes pucch-ConfigCommon and timeAlignmentTimerCommon. The second uplink IBWP configuration information may include pucch-ConfigCommon_RedCap. The pucch-ConfigCommon may include a first pucch-ResourceCommon and a first p0-norminal. The pucch-ConfigCommon_RedCap may include a second pucch-ResourceCommon and a second p0-norminal. pucch-ConfigCommon is information for a normal UE. pucch-ConfigCommon_RedCap is information for RedCap UE. timeAlignmentTimerCommon is information commonly applied to normal UE and RedCap UE.

The RedCap UE transmits the preamble and initiates timeAlignmentTimerCommon upon reception of the RAR. Upon receiving Msg 4, the UE transmits a HARQ ACK by applying a predetermined pucch-ResourceCommon and a predetermined p0-normal.

If both the second pucch-ResourceCommon and the first pucch-ResourceCommon exist, the time/frequency/code resource for transmitting the HARQ ACK is determined by applying the second pucch-ResourceCommon. If only the first pucch-ResourceCommon exists, the time/frequency/code resource for transmitting the HARQ ACK is determined by applying the first pucch-ResourceCommon.

When both the second p0-norminal and the first p0-norminal exist, the second p0-norminal is applied to determine a power offset to be applied to the HARQ ACK. If only the first p0-norminal exists, the power offset to be applied to the HARQ ACK is determined by applying the first p0-norminal. If neither the second p0-norminal nor the p0-norminal exist, a power offset to be applied to the HARQ ACK is determined by applying a predetermined value. The predetermined value may be, for example, 2 dBm.

In step 3A-17, the RedCap UE determines whether the current cell is a barred cell or an allowed cell, in consideration of MIB and SIB1.

Regarding cell barring, the RedCap UE determines that the current cell is not barred if all of the following conditions are satisfied. The conditions below are defined so that the RedCap UE camps on the cell only when it can operate properly in the cell.

<Cell Allowance Conditions>

0: The received MIB's cellBarred is set to notBarred.

1: IFRI_SIB1 exists (or is included) in the received SIB1. This is because the absence of IFRI_SIB1 means that the corresponding cell does not consider the operation of the RedCap UE, and the presence of IFRI_SIB1 means that the corresponding cell is a cell that considers the operation of the RedCap UE.

2: If the current cell is TDD cell, the UE supports one or more of the frequency bands indicated in the frequencyBandList for downlink in the received SIB1 for TDD, or one or more of the frequency bands indicated in the frequencyBandList for uplink in the received SIB1 for FDD, and they are not downlink only bands, and 3: The UE supports an uplink channel bandwidth with a maximum transmission bandwidth configuration fulfilling following conditions: It is smaller than or equal to the uplink carrierBandwidth indicated in SIB1 and it is wider than or equal to the bandwidth of the initial uplink BWP 4: the UE supports a downlink channel bandwidth with a maximum transmission bandwidth configuration fulfilling following conditions: It is smaller than or equal to the downlink carrierBandwidth indicated in SIB1 it is wider than or equal to the bandwidth of the initial downlink BWP 5: trackingAreaCode is provided in SIB1 for the selected PLMN or the registered PLMN or PLMN of the equivalent PLMN list For example, if trackingAreaCode x is included in SIB1 and trackingAreaCode related to the registered PLMN of the terminal is also x, condition 5 is satisfied. The trackingAreaCode related to the PLMN is provided to the terminal by the AMF during the registration procedure with the terminal.

The RedCap UE, which determines that the current cell is not barred, performs the following operation.

<Operation of Terminal after Receiving SIB1 in Non-Prohibited Cell>

1: Apply the configuration included in the servingCellConfigCommon. More specifically, the UE applies the TDD-UL-DL configuration to determine a downlink slot, an uplink slot, a downlink symbol, and an uplink symbol, and applies a PDSCH configuration selected from among a plurality of PDSCH-ConfigCommon to receive a PDSCH, and applies a PUSCH configuration selected from among a plurality of PUSCH-ConfigCommon to transmit a PUSCH.

2: A specified PCCH configuration is applied. The specified PCCH configuration is no SDAP, no PDCP, and RLC TM. A paging message is received by applying the PCCH configuration.

3: If a valid SIB is stored, the stored SIB is used, and if a valid SIB is not stored, a related system information message (SI message) is acquired The UE also receives subsequent system information, for example, SIB2, SIB3, SIB4, etc. in the not barred cell. SIB2 includes parameters for intra-frequency cell reselection. SIB3 includes other parameters for intra-frequency cell reselection. SIB4 contains parameters for cell reselection between frequencies.

The RedCap UE regards the current serving cell as a barred cell in the cases listed in the table below and performs an appropriate operation according to the situation.

TABLE 6

| Case | Situation | RedCap UE operation |
|---|---|---|
| 1 | MIB reception failure | The current cell is considered as a barred cell.<br>The current cell is excluded from cell selection/cell reselection candidates for 300 seconds.<br>It is assumed that both IFRI_MIB and IFRI_SIB1 are allowed. That is, neighboring cells of the corresponding frequency may be included in the cell selection/cell reselection candidates. |
| 2 | Successful reception of MIB with cellBarred set to notBarred.<br>SIB1 reception failure | The current cell is considered as a barred cell.<br>Excludes the current cell from candidates for cell selection/cell reselection for 300 seconds.<br>If the received IFRI_MIB is allowed, IFRI_SIB1 is considered as allowed, and neighboring cells of the corresponding frequency may be included in the cell selection/cell reselection candidates.<br>If the received IFRI_MIB is NotAllowed, IFRI_SIB1 is also considered as NotAllowed, and neighboring cells of the corresponding frequency are excluded from cell selection/cell reselection candidates. |
| 3 | Successful reception of MIB with cellBarred set to Barred. | The current cell is considered a barred cell.<br>Excludes the current cell from candidates for cell selection/cell reselection for 300 seconds.<br>If the received IFRI_MIB is allowed, IFRI_SIB1 is considered as allowed, and neighboring cells of the corresponding frequency may be included in the cell selection/cell reselection candidates.<br>If the received IFRI_MIB is NotAllowed, IFRI_SIB1 is also considered as NotAllowed, and neighboring cells of the corresponding frequency are excluded from the cell selection/cell reselection candidates.<br>The general terminal does not receive SIB1.<br>The RedCap UE may receive SIB1 instead of referring to IFRI_MIB, and may exclude or include neighboring cells of the corresponding frequency from cell selection/cell reselection candidates according to the received value of IFRI_SIB1. |
| 4 | Successful MIB reception with cellBarred set to notBarred. SIB1 reception without IFRI_SIB1 | The current cell is considered as a barred cell.<br>Excludes the current cell from candidates for cell selection/cell reselection for 300 seconds.<br>Regardless of the value of the received IFRI_MIB, IFRI_SIB1 may be considered as NotAllowed and neighboring cells of the corresponding frequency may be excluded from cell selection/cell reselection candidates. |
| 5 | Successfully received MIB with cellBarred set to notBarred. Received SIB1 with IFRI_SIB1<br>The bandwidth supported by the terminal is less than the bandwidth of the IBWP. | The current cell is considered a barred cell.<br>Excludes the current cell from candidates for cell selection/cell reselection for 300 seconds.<br>According to the received IFRI_SIB value, neighboring cells of the corresponding frequency are included or excluded from the cell selection/cell reselection candidates. |
| 6 | Successful reception of MIB with cellBarred set to notBarred. Received SIB1 | The current cell is considered a barred cell.<br>Excludes the current cell from candidates for cell selection/cell reselection for 300 seconds. |

TABLE 6-continued

| Case | Situation | RedCap UE operation |
|---|---|---|
| | with IFRI_SIB1 The bandwidth supported by the terminal is greater than or equal to the bandwidth of the IBWP. There is no TrackingAreaCode matching the TrackingAreaCode received from SIB1. | Regardless of the received IFRI values, both IFRI_MIB and IFRI_SIB1 are considered as NotAllowed and neighboring cells of the corresponding frequency are excluded from cell selection/cell reselection candidates. |

The reason why the RedCap UE operates as described above is to prevent camp-on in a cell that does not support the RedCap function and to appropriately control whether or not to reselect cells for cells of the same frequency. If there is no IFRI to be referred to as in case 1, both IFRIs may be assumed to be a predetermined value and may be operated accordingly. Alternatively, if reception of IFRI_SIB1 fails as in case 2, IFRI_MIB may be referred to.

The RedCap UE may be given two IFRI parameters: IFRI_MIB and IFRI_SIB1. RedCap UE considers two parameters and determines whether to allow intra-frequency reselection as shown in the table below.

TABLE 7

| IFRI_MIB | IFRI_SIB1 | RedCap UE operation | Note |
|---|---|---|---|
| Reception failure | Reception failure | IFRI_SIB1 is considered as Allowed | |
| Allowed | Reception failure | IFRI_SIB1 is considered as Allowed | IFRI_SIB1 considered as the same value as IFRI_MIB |
| Allowed | Not Present | IFRI_SIB1 is considered as NotAllowed | It is determined that RedCap is not supported in the corresponding frequency. |
| Allowed | Allowed | IFRI_SIB1 is considered as Allowed | the received IFRI_SIB1 is applied as it is |
| Allowed | NotAllowed | IFRI_SIB1 is considered as NotAllowed | the received IFRI_SIB1 is applied as it is |
| NotAllowed | Reception failure | IFRI_SIB1 is considered as NotAllowed | IFRI_SIB1 considered as the same value as IFRI_MIB |
| NotAllowed | Not Present | IFRI_SIB1 is considered as NotAllowed | It is determined that RedCap is not supported in the corresponding frequency. |
| NotAllowed | Allowed | IFRI_SIB1 is considered as Allowed | the received IFRI_SIB1 is applied as it is |
| NotAllowed | NotAllowed | IFRI_SIB1 is considered as NotAllowed | the received IFRI_SIB1 is applied as it is |

The RedCap UE applies the received IFRI_SIB1, if both IFRI_MIB and IFRI_SIB1 are received.

The RedCap UE considers that IFRI_SIB1 is Allowed If neither IFRI_MIB nor IFRI_SIB1 are received.

If the RedCap UE receives IFRI_MIB but does not receive IFRI_SIB1, it determines IFRI_SIB1 by distinguishing whether SIB1 reception has failed or IFRI_SIB1 is not included in SIB1. If the reception of SIB1 is unsuccessful, the UE considers that IFRI_SIB1 is the same as IFRI_MIB. If SIB1 is received but IFRI_SIB1 is not included, the UE considers that IFRI_SIB1 is a predetermined value (e.g., notAllowed). This is because, since cells of the same frequency in the same region are highly likely to be configured identically, if IFRI_SIB1 is not provided in the current cell, it is highly likely that IFRI_SIB1 is not provided in other cells as well. Alternatively, If IFRI_SIB1 is preconfigured to be considered as Allowed when UE has received SIB1 from the base station but IFRI_SIB1 is not included, IFRI_SIB1 is considered as Allowed.

If MIB reception fails, IFRI_MIB cannot be received.

If IFRI_SIB1 is Allowed, the RedCap UE may select or reselect other cells of the same frequency as the barred cell if the cell reselection selection criteria are fulfilled If IFRI_SIB1 is NotAllowed, for 300 seconds the RedCap UE does not select or reselect other cells of the same frequency as the barred cell, and excludes them from candidates for cell selection/reselection.

If IFRI_SIB1 is NotAllowed, the RedCap UE sets the cell reselection priority of the frequency of the barred cell for 300 seconds to the lowest priority. The RedCap UE performs cell reselection for frequencies other than the barred cell frequency. At this time, the RedCap UE performs cell reselection by applying the cell reselection priority indicated in the system information received from an NR cell other than the first NR cell.

A UE camped on a not barred cell and prepares to perform random access in order to perform a necessary procedure. The UE refers to the received ServingCellConfigCommon.

In steps 3A-21, the RedCap UE transmits a preamble to the base station.

If both prach-ConfigurationIndex_RedCap and prach-ConfigurationIndex are included in rach-ConfigCommon (or ServingCellConfigCommon), the RedCap UE applies prach-ConfigurationIndex_RedCap to determine a radio frame, subframe, slot, symbol and preamble format in which preamble transmission is possible. If only prach-ConfigurationIndex is included in rach-ConfigCommon (or in ServingCellConfigCommon), RedCap UE determines radio frame, subframe, slot, symbol and preamble format in which preamble transmission is possible by applying prach-ConfigurationIndex.

If both msg1-FrequencyStart_RedCap and msg1-FrequencyStart are included in rach-ConfigCommon (or ServingCellConfigCommon), the RedCap UE applies msg1-FrequencyStart_RedCap to determine a frequency region in which preamble transmission is possible. If only msg1-FrequencyStart is included in rach-ConfigCommon (or ServingCellConfigCommon), RedCap UE applies msg1-FrequencyStart to determine a frequency range in which preamble transmission is possible.

RedCap UE selects SSB by applying rsrp-ThresholdSSB_RedCap if both rsrp-ThresholdSSB_RedCap and rsrp-ThresholdSSB are included in rach-ConfigCommon (or in ServingCellConfigCommon). RedCap UE selects SSB by applying rsrp-ThresholdSSB if only rsrp-ThresholdSSB is included in rach-ConfigCommon (or ServingCellConfigCommon). The terminal selects an SSB having the highest received signal strength among SSBs having a received signal strength higher than the threshold value. The UE selects a preamble/PRACH transmission opportunity (Occasion) corresponding to the selected SSB and transmits the preamble.

After transmitting the preamble, the UE monitors whether a random access response message is received during the random access response window, and if not received, retransmits the preamble. As the maximum number of preamble retransmissions, the UE applies preambleTransMax_RedCap when both preambleTransMax_RedCap and preambleTransMax are included in ServingCellConfigCommon, and applies preambleTransMax when only preambleTransMax is included. The UE applies msg1-SubcarrierSpacing included in rach-ConfigCommon when transmitting the preamble.

One ServingCellConfigCommon may include two prach-ConfigurationIndex, two msg1-FrequencyStart, two rsrp-ThresholdSSB, two preambleTransMax and one msg1-SubcarrierSpacing for Msg1 transmission. One of the two prach-ConfigurationIndex, one of the two msg1-FrequencyStart, one of the two rsrp-ThresholdSSB, and one of the two preambleTransMax apply only to RedCap UEs, and msg1-SubcarrierSpacing is applied to both RedCap UEs and non-RedCap UEs. Msg 1 is the preamble.

In steps 3A-23, a random access response message is received from the base station. The random access response message includes information such as an uplink grant for Msg 3 transmission, a time domain allocation indicator, and a temporary identifier of the terminal.

The random access response message is addressed by the RA-RNTI. The terminal receives a random access response message by monitoring a predetermined SS in a predetermined CORESET in the random access window time period.

If ServingCellConfigCommon includes controlResourceSetZero, searchSpaceZero, ra-SearchSpace, controlResourceSetZero_RedCap, searchSpaceZero_RedCap, and ra-SearchSpace_RedCap and If ra-SearchSpace_RedCap indicates 0, RedCap UE applies 3rd CORESET #0 and 3rd SS #0 to RA-Monitor the RNTI and receive a random access response message.

If only controlResourceSetZero, searchSpaceZero, and ra-SearchSpace are included in servingCellConfigCommon and If ra-SearchSpace indicates 0, the RedCap UE applies the 2nd CORESET #0 and the 2nd SS #0 to monitor the RA-RNTI and receive a random access response message.

If controlResourceSetZero, searchSpaceZero, ra-SearchSpace, controlResourceSetZero_RedCap, searchSpaceZero_RedCap, and ra-SearchSpace_RedCap are all included in servingCellConfigCommon and if ra-SearchSpace_RedCap indicates a value other than 0, the RedCap UE applies the SS having the indicated identifier and the CORESET associated with the SS to monitor RA-RNTI and receive a random access response message.

If only controlResourceSetZero, searchSpaceZero and ra-SearchSpace are included in servingCellConfigCommon and if ra-SearchSpace indicates a value other than 0, the RedCap UE applies the SS having the indicated identifier and the CORESET associated with the SS to monitor RA-RNTI and receive a random access response message.

If both ra-ResponseWindow and ra-ResponseWindow_RedCap are included in ServingCellConfigCommon, the RedCap UE determines the length of the random access response window by applying ra-ResponseWindow_RedCap.

If only ra-ResponseWindow is included in ServingCellConfigCommon, RedCap UE determines the length of the random access response window by applying ra-ResponseWindow.

Upon receiving the random access response, the RedCap UE starts timeAlignmentTimer and generates a MAC PDU to transmit Msg 3 to the base station. The MAC PDU includes an uplink RRC control message such as RRCRequest.

In step 3A-25, the RedCap UE transmits Msg 3 to the base station and starts the contention resolution timer. If servingCellConfigCommon contains both ra-ConttentionResolutionTimer and ra-ContentionResolutionTimer_RedCap, the RedCap UE sets the contention resolution timer to ra-ContentionResolutionTimer_RedCap. If servingCellConfigCommon contains only ra-ConttentionResolutionTimer, RedCap UE sets contention resolution timer to ContentionResolutionTimer.

Msg 3 transmission time is determined by the time domain allocation indicator of the random access response message. The RedCap UE determines the start time and transmission duration of the PUSCH to which Msg 3 is to be transmitted according to the PUSCH time domain allocation entry, indicated by a time domain allocation indicator, of a specific list from among a pusch-TimeDomainAllocationList, a second pusch-TimeDomainAllocationList and a default list.

In steps 3A-27, the RedCap UE receives Msg 4 from the base station. Msg 4 includes a downlink RRC control message such as RRCSetup.

The RedCap UE determines a transmission resource for transmitting the HARQ ACK for Msg 4 by selecting one of the first PUCCH common resource information (pucch-ResourceCommon) and the second PUCCH common resource information (pucch-ResourceCommon).

The RedCap UE determines the nominal power offset to be applied to HARQ ACK transmission for Msg 4 by selecting one of a nominal power offset (p0-normal) included in the first PUCCH common configuration information (pucch-ConfigCommon) and a nominal power offset (p0-norminal) included in the second PUCCH common configuration information (pucch-ConfigCommon) and a nominal power offset fixed to a predetermined value.

The RedCap UE and the base station that have transmitted and received the RRCRequest message and the RRCSetup message establish an RRC connection.

The base station and the AMF may transmit/receive various NAS messages and control messages to the UE for which the RRC connection is configured in steps 3A-31.

The RedCap UE and the base station can exchange configuration information and the like through RRC connection, configure a bearer, and then transmit/receive data.

In ServingCellConfigCommon of SIB1, PDCCH-ConfigCommon2 is located behind PDCCH-ConfigCommon. In ServingCellConfigCommon of SIB1, PUCCH-ConfigCommon2 is located behind PUCCH-ConfigCommon. In ServingCellConfigCommon of SIB1, RACH-ConfigCommon2 is located behind RACH-ConfigCommon.

In ServingCellConfigCommon of SIB1, the second downlink IBWP configuration information is located behind the first downlink IBWP configuration information. In ServingCellConfigCommon of SIB1, the second uplink IBWP configuration information is located behind the first uplink IBWP configuration information. In ServingCellConfigCommon of SIB1, controlResourceSetZero_RedCap is located behind controlResourceSetZero. In ServingCellConfigCommon of SIB1, searchSpaceZero_RedCap is located behind searchSpaceZero. In ServingCellConfigCommon of SIB1, ra-SearchSpace_RedCap is located behind ra-SearchSpace. The order of various pieces of information is defined as described above in order to maintain backward compatibility with a terminal or a base station of a previous release.

Figure 3B:
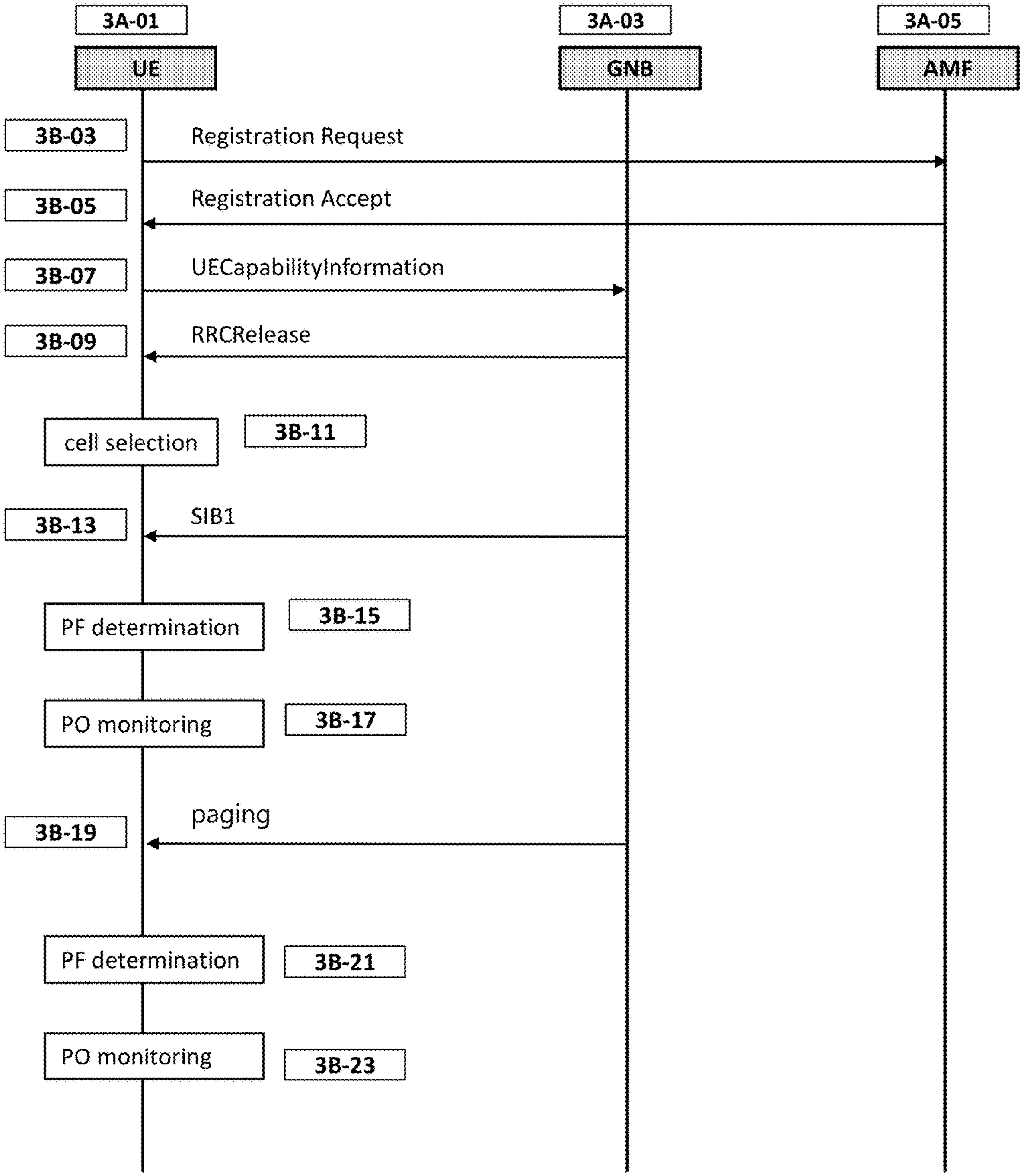
FIG. 3B is a diagram illustrating operations of a terminal and a base station related to discontinuous reception according to an embodiment of the present invention.

FIG. 3B is a diagram illustrating operations of UE and a base station related to a discontinuous reception operation.

In step 3B-03, UE transmits a registration request message to the AMF. The registration request message includes information related to registration, for example, information such as a permanent identifier of UE. The registration request message may also include information related to discontinuous reception. UE may include a desired discontinuous cycle in the control message. UE may include two discontinuous reception cycles in the control message. The first discontinuous reception cycle has a relatively short value, and the second cycle has a relatively long value. The second cycle is also called an extended discontinuous cycle. Since UE including the extended discontinuous cycle in the control message means that UE supports the extended discontinuous cycle, the information requesting the extended discontinuous cycle can be understood as information related to support for the discontinuous extension cycle.

Upon receiving the control message, the AMF determines whether to accept the registration request of UE using a permanent identifier of UE. If the registration request is accepted, the AMF sends a registration accept message to UE.

In step 3B-05, UE receives a registration accept message from the AMF. The message includes information related to the security key, temporary identifier information, and the like. The temporary identifier is an identifier allocated by the core network and has a length of 48 bits. The temporary identifier is valid until a new temporary identifier is allocated and is referred to as a first UE identifier. The message may also include two pieces of information related to discontinuous reception in two fields. The first field indicates one of discontinuous reception cycle value not specified (DRX value not specified), discontinuous reception cycle parameter=32 (DRX cycle parameter T=32), discontinuous reception cycle parameter=64, discontinuous reception cycle parameter=128 and discontinuous reception cycle parameters=256. The second field indicates the extended discontinuous reception cycle length duration (eDRX cycle length duration) and indicates one of 5.12 seconds, 10.24 seconds, 20.48 seconds, 40.96 seconds, 61.44 seconds, 81.92 seconds, 102.4 seconds, 122.88 seconds, 143.36 seconds, 163.84 seconds, 327.68 seconds. It indicates one of seconds, 655.36 seconds, 1310.72 seconds, 2621.44 seconds, 5242.88 seconds, and 10485.76 seconds. The first field is for a normal discontinuous reception cycle, and a first discontinuous reception value is configured by the first field. The second field relates to the extended discontinuous reception cycle, and a second discontinuous reception value is configured by the second field. The discontinuous cycle indicated in the first field and the extended discontinuous cycle indicated in the second field are used to determine the first UE-specific discontinuous reception value. The discontinuous reception cycle parameters 32, 64, 128, and 256 mean discontinuous reception cycle values of 320 ms, 640 ms, 1280 ms and 2560 ms. As shown above, the set of values related to the first field and the set of values related to the second field do not have a common element and are mutually exclusive. This is because there is no need to configure the same discontinuous cycle in the first field and the second field.

In step 3B-07, UE transmits UE capability information message to the base station. The base station may transmit UE capability request control message to UE, and UE transmits UE capability information message in response thereto. The control message may include information indicating support for extended discontinuous reception. The extended discontinuous reception support information may be reported for each radio access technology. For example, the UE may separately include information indicating support for extended discontinuous reception in EUTRA/LTE and information indicating support for extended discontinuous reception in NR. Whether extended discontinuous reception is supported is information indicating whether extended discontinuous reception is supported in an INACTIVE state.

The base station configures UE based on the capability of UE. The base station and UE transmit and receive data. When data transmission/reception is completed, the base station determines to release the RRC connection with UE.

In step 3B-09, the base station transmits an RRCRelease message to UE. The RRCRelease message includes SuspendConfig IE and SuspendConfig includes the following information.

<SuspendConfig>

1: Second UE identifier. Identifier of UE that can be included in ResumeRequest when state transitions to RRC_CONNECTED. It is 40 bits long.

2: Third UE identifier. Identifier of UE that can be included in ResuemeRequest when state transitions to RRC_CONNECTED. It has a length of 24 bits.

3: ran-Paging Cycle. The paging cycle to apply in the RRC_INACTIVE state. A third discontinuous reception value is configured by the field.

4: ran-NotificationAreaInfo. Configuration information of ran-NotificationArea composed of a list of cells, etc. When the ran_NotificationArea is changed, the UE initiates the resumption procedure.

5: t380. A timer associated with the cycleic resume procedure.

6. ran-extendedPagingCycle. Extended paging cycle to apply in RRC_INACTIVE state. A fourth discontinuous reception value is configured by the field.

UE stores various information of the SuspendConfig including the third discontinuous reception value and the fourth discontinuous reception value.

The third discontinuous reception value is one of 32, 64, 128, and 256, and the fourth discontinuous reception value is one of 256, 512, and 1024. Both units are radio frames. UE in the INACTIVE state monitors paging in a specific radio frame called a paging frame. When the normal discontinuous reception is configured, UE determines the paging frame with the third discontinuous reception value, and when the extended discontinuous reception is configured, UE determines the paging frame with the fourth discontinuous reception value. When only the third discontinuous reception value is included in SuspendConfig, normal discontinuous reception is configured, and when both the third and fourth discontinuous reception values are included, extended discontinuous reception is configured. In the SuspendConfig, the third discontinuous reception value is mandatorily present and the fourth discontinuous reception value is optionally present. Since the third discontinuous reception value was defined as mandatory in the previous release, it is defined to be mandatorily present in the present disclosure to ensure backward compatibility. If both the third discontinuous reception value and the fourth discontinuous reception value exist in SuspendConfig, UE ignores the third discontinuous reception value and uses the fourth discontinuous reception value.

In step 3B-11, the UE moves to a new cell. The UE may reselect a neighboring cell with better radio signal quality by comparing the radio signal quality of the serving cell and the neighboring cell. Alternatively, a cell having a radio signal quality equal to or greater than a predetermined criteria may be selected.

In step 3B-13, the UE receives system information including SIB1 in the new cell. SIB1 may include the following information.

<SIB1>

1: Identifier of the cell.

2: 1-bit information indicating whether extended discontinuous reception is allowed. If this information is present in SIB1, it means that extended discontinuous reception is allowed in the corresponding cell. If this information does not exist in SIB1, it means that extended discontinuous reception is not allowed in the corresponding cell.

3: Default paging cycle. It indicates one of 32, 64, 128, and 256 and the unit is a radio frame. The length of one radio frame is 10 ms.

4: Parameters related to the modification cycle. It indicates a value of 2, 4, 8, or 16.

5: Hyperframe number (HFN). Hyper frame is also called hyper system frame, and hyper frame number is also called hyper system frame number.

In step 3B-15, UE determines the paging frame.

A paging frame occurs every reference discontinuous reception cycle. A paging frame is an SFN that satisfies the following equation.

$$(\text{SFN}+\text{PF\_offset}) \bmod T=(T \text{ div } N)*(UE\_ID \bmod N) \quad \text{[Equation 1]}$$

T is the reference discontinuous reception cycle, and PF_offset and N are parameters set in SIB1. UE_ID corresponds to the first UE identifier. Through Equation 1, UEs are distributed among several paging frames.

UE monitors paging at a paging occasion of the paging frame or at a paging occasion starting from the paging frame. The paging occasion is composed of a plurality of consecutive PDCCH monitoring occasions, and the PDCCH monitoring occasion is a timeslot in which the paging DCI can be transmitted. One PDCCH monitoring occasion corresponds to one downlink beam.

In an arbitrary cell, UE in an INACTIVE state and the base station determine the reference discontinuous reception cycle as follows.

If extended discontinuous reception is not applied to the cell, the shortest value among the first UE-specific discontinuous reception value, the second UE-specific discontinuous reception value, and the default paging cycle is determined as the reference discontinuous reception cycle.

When extended discontinuous reception is applied to the cell, a second UE-specific discontinuous reception value is determined as a reference discontinuous reception cycle.

If the fourth discontinuous reception value is configured for the INACTIVE UE in suspendConfig of the RRCRelease message, and the SIB1 of the cell includes information indicating that extended discontinuous reception is allowed, the extended discontinuous reception is applied to the INACTIVE UE in the cell.

The first UE-specific discontinuous reception value is a second discontinuous reception value if the second discontinuous reception value is a specific value, and a first discontinuous reception value if the second discontinuous reception value is not a specific value. The specific values are 5.12 seconds and 10.24 seconds, which are the lowest values among the second discontinuous reception values. When the second discontinuous reception value exceeds 10.24 seconds, that is, when it is not a specific value, since it is impossible to specify the paging frame by SFN, the first discontinuous reception value is used as the first UE-specific discontinuous reception value. The first UE-specific discontinuous reception value is a value for the discontinuous reception cycle of the idle state UE. The idle state UE monitors the paging to receive the paging generated by the core network.

The second UE-specific discontinuous reception value is a third discontinuous reception value when only the third discontinuous reception value is included in SuspendConfig, and a fourth discontinuous reception value when both the third discontinuous reception value and the fourth discontinuous reception value are included. The second UE-specific discontinuous reception value is a value for the discontinuous reception cycle of UE in an INACTIVE state. The INACTIVE UE monitors the paging to receive the paging generated by the RAN. The INACTIVE UE also monitors the paging to receive the paging generated by the core network. Accordingly, the INACTIVE UE determines the reference discontinuous reception cycle in consideration of the first UE-specific discontinuous reception value as well as the second UE-specific discontinuous reception value.

The maximum value of the third discontinuous reception value and the minimum value of the fourth discontinuous reception value are equal to 256. Accordingly, if the second UE-specific discontinuous reception value is 256, it may be determined by the third discontinuous reception value or may be determined by the fourth discontinuous reception value. The reason the specific discontinuous reception value is defined for both the normal discontinuous reception and the extended discontinuous reception is to apply different monitoring operations to the discontinuous reception value. That is, if 256 is configured for normal discontinuous reception, UE determines the paging frame in consideration of the default paging cycle, and as a result, a value shorter than 256 may be used for the actual discontinuous reception cycle. However, if 256 is configured for extended discontinuous reception, the actual discontinuous cycle of UE is 256 regardless of the length of the default paging cycle.

After receiving both the first discontinuous reception value and the second discontinuous reception value in the registration accept message, and receiving both the third discontinuous reception value and the fourth discontinuous reception value in SuspendConfig of the RRCRelease message, UE determines paging frames as follows in an arbitrary cell.

If information indicating that extended discontinuous reception is allowed is not included in SIB1 of the cell, extended discontinuous reception is not applied in the cell, and a paging frame is determined based on the first discontinuous reception value, the third discontinuous reception value and the default paging cycle.

If information indicating that extended discontinuous reception is allowed is included in SIB1 of the cell and the second discontinuous reception value is a specific value, extended discontinuous reception is applied in the cell, paging frame is determined based on the default paging cycle and the second discontinuous reception value and the fourth discontinuous reception value.

If information indicating that extended discontinuous reception is allowed is included in SIB1 of the cell and the second discontinuous reception value is not a specific value, extended discontinuous reception is applied in the cell, and a paging frame is determined based on the fourth discontinuous reception value and the default paging cycle and the first discontinuous reception value and the second discontinuous reception value. If the second discontinuous reception value is neither 5.12 second nor 10.24 second, UE receives core network paging only in a paging transmission window. The paging transmission window occurs periodically with a periodicity of the second discontinuous reception value.

In the paging transmission window, UE determines the shortest of the first discontinuous reception value, the fourth discontinuous reception value, and the default paging cycle, or the shortest of the first discontinuous reception value and the default paging cycle, as the reference discontinuous reception cycle, and determines the paging frame.

Outside the paging transmission window, UE determines the fourth discontinuous reception value as the reference discontinuous reception cycle to determine the paging frame.

UE that receives both the first discontinuous reception value and the second discontinuous reception value in the registration accept message and only the third discontinuous reception value in SuspendConfig of the RRCRelease message determines a paging frame in an arbitrary cell as follows.

If information indicating that extended discontinuous reception is allowed is not included in SIB1 of the cell, extended discontinuous reception is not applied in the cell, and a paging frame is determined based on the first discontinuous reception value, the third discontinuous reception value, and the default paging cycle.

If the information indicating that extended discontinuous reception is allowed is included in SIB1 of the cell and the second discontinuous reception value is a specific value, extended discontinuous reception is applied in the cell, a paging frame is determined based on the default paging cycle and the second discontinuous reception value and the third discontinuous reception value.

If information indicating that extended discontinuous reception is allowed is included in SIB1 of the cell and the second discontinuous reception value is not a specific value, extended discontinuous reception is applied in the cell, and a paging frame is determined based on the third discontinuous reception value and the default paging cycle and the first discontinuous reception value and the second discontinuous reception value.

In the paging transmission window, UE determines the paging frame by determining the shortest value among the first discontinuous reception value, the third discontinuous reception value, and the default paging cycle as the reference discontinuous reception cycle.

Outside the paging transmission window, UE determines the paging frame by determining the shorter of the third discontinuous reception value and the default paging cycle as the reference discontinuous reception cycle.

After receiving the second discontinuous reception value in the registration accept message and receiving both the third discontinuous reception value and the fourth discontinuous reception value in SuspendConfig of the RRCRelease message, UE determines a paging frame in a cell as follows.

If information indicating that extended discontinuous reception is allowed is not included in SIB1 of the cell, extended discontinuous reception is not applied in the cell, and a paging frame is determined based on the third discontinuous reception value and the default paging cycle.

If information indicating that extended discontinuous reception is allowed is included in SIB1 of the cell and the second discontinuous reception value is a specific value, extended discontinuous reception is applied in the cell, and a paging frame is determined based on the fourth discontinuous reception value and the default paging cycle.

If information indicating that extended discontinuous reception is allowed is included in SIB1 of the cell and the second discontinuous reception value is not a specific value, extended discontinuous reception is applied in the cell, and a paging frame is determined based on the second discontinuous reception value and the fourth discontinuous reception value and the default paging cycle.

In the paging transmission window, UE determines the paging frame by determining default paging cycle or the shortest value among the fourth discontinuous reception value and the default paging cycle as the reference discontinuous reception cycle.

Outside the paging transmission window, UE determines the fourth discontinuous reception value as the reference discontinuous reception cycle to determine the paging frame.

In step 3B-17, UE monitors the paging occasion. The paging occasion consists of a plurality of PDCCH monitoring occasions. Each PDCCH monitoring occasion corresponds to a specific downlink beam, and the UE may monitor the PDCCH monitoring occasion corresponding to the best beam in one paging occasion. Alternatively, multiple PDCCH monitoring occasions may be monitored to increase the paging reception probability. A paging occasion starts at the paging frame. The PDCCH monitoring occasion to be monitored by the UE may belong to the paging frame or a subsequent radio frame.

In step 3B-19, UE receives the paging including the first UE identifier or the second UE identifier. The paging including the first UE identifier is a paging generated in the core network, and the paging including the second UE identifier is a paging generated in the RAN. When the paging generated in the core network is transmitted to the INACTIVE UE, it means that the core network misunderstands the state of UE as an idle state. UE transitions from the INACTIVE state to the idle state and selects a new cell. And it monitors paging in the new cell. Upon receiving the paging including the second UE identifier, UE proceeds with the radio resource control connection resumption procedure and transitions to the connected state. UE monitors paging in the cell until it transitions to the connected state.

In step 3B-21, UE determines the paging frame. If paging including the first UE identifier is received, UE selects a new cell and determines a paging frame in the new cell. UE discards the third discontinuous reception value and the fourth discontinuous reception value, and determines the paging frame based on the first discontinuous reception value, the second discontinuous reception value, and the default paging cycle. If the paging including the second UE identifier is received, UE determines a paging frame based on the first discontinuous reception value, the second discontinuous reception value, the default paging cycle and one of the third discontinuous reception value and the fourth discontinuous reception value, as in steps 3B-15.

In step 3B-23, UE monitors the paging occasion in consideration of the determined paging frame.

Figure 3C:
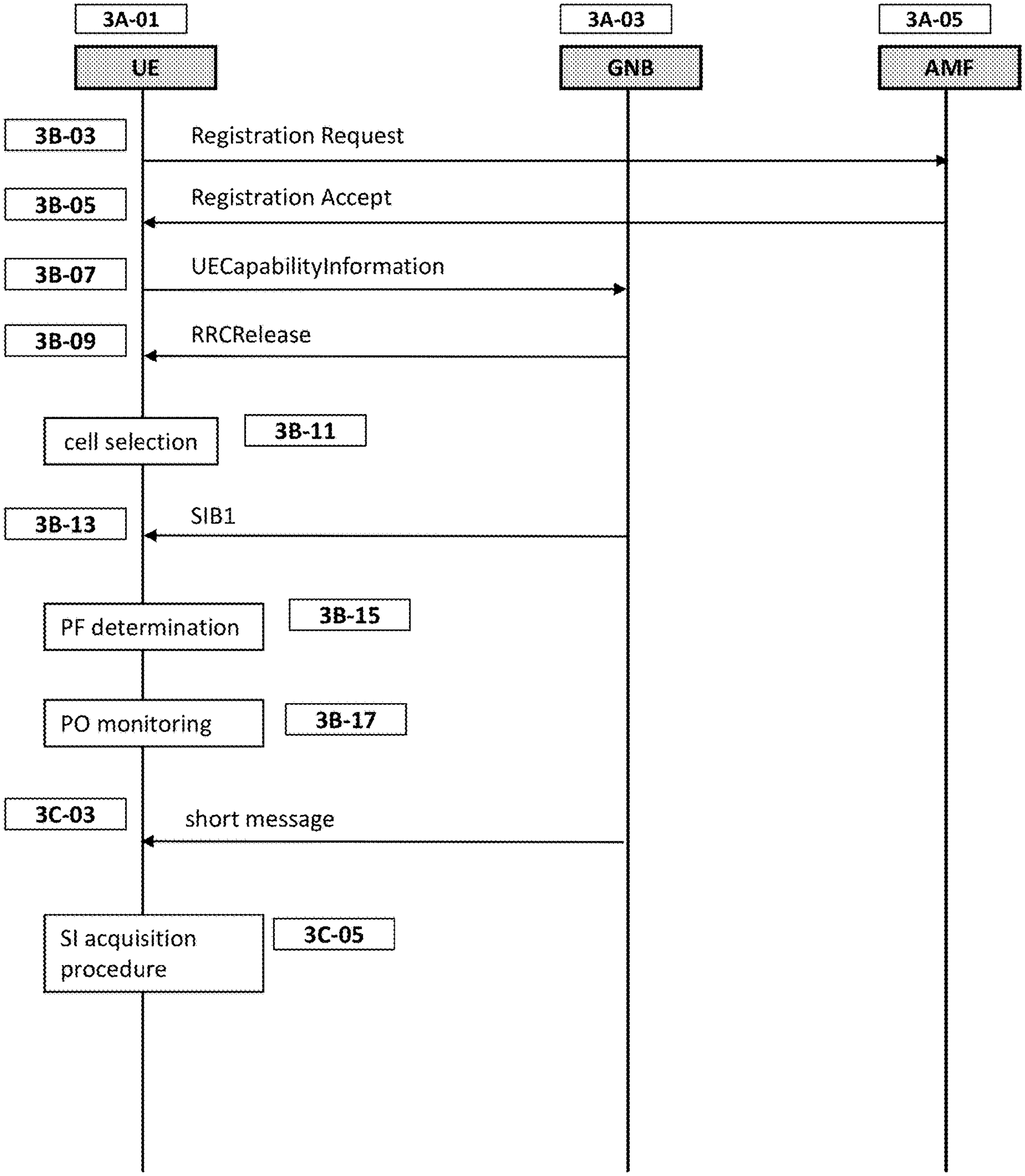
FIG. 3C is a diagram illustrating operations of a terminal and a base station related to system information update according to an embodiment of the present invention.

FIG. 3C is a diagram illustrating operations of UE and a base station related to system information update.

When system information change is required, in order for plurality of UEs to acquire updated system information at the same time, the base station changes system information from the start of the modification cycle or extended discontinuous reception acquisition cycle (eDRX acquisition cycle) and UEs newly acquire system information at the beginning of the cycle. That the system information has been changed is notified to UEs through a specific bit of a Short Message transmitted along with paging.

3B-03, 3B-05, 3B-07, 3B-09, 3B-11, 3B-13, 3B-15, 3B-17 have been described with reference to FIG. 3B.

In step 3C-03, the base station transmits a Short Message to UE. The Short Message consists of 8 bits, and the MSB is referred to as bit1 and the LSB is referred to as bit8. Each bit of a Short Message means the following.

TABLE 8

| Bit | Short Message |
|---|---|
| 1 | systemInfoModification<br>If set to 1: indication of a BCCH modification other than SIB6, SIB7 and SIB8 . . . This indication applies to UEs using eDRX cycle equal to or shorter than the BCCH modification cycle or using DRX cycle in the corresponding cell. |
| 2 | etwsAndCmasIndication<br>If set to 1: indication of an ETWS primary notification and/or an ETWS secondary notification and/or a CMAS notification. |
| 3 | stopPagingMonitoring<br>This bit can be used for only operation with shared spectrum channel access and if nrofPDCCH-MonitoringOccasionPerSSB-InPO is present. If set to 1: indication that the UE may stop monitoring PDCCH occasion(s) for paging in this Paging Occasion |
| 4 | systemInfoModification-eDRX<br>If set to 1: indication of a BCCH modification other than SIB6, SIB7 and SIB8. This indication applies only to UEs using eDRX cycle longer than the BCCH modification cycle in the corresponding cell. |
| 5-8 | Not used |

UE receives the Short Message. When the first set of conditions is satisfied, UE applies the system information acquisition procedure from the start of the next modification cycle. When the second condition set is satisfied, UE applies the system information acquisition procedure from the start of the next extended discontinuous reception acquisition cycle.

<Satisfying the First Set of Conditions>

1: Receive a Short Message with bit 1 set to 1.

2: One of the conditions below is met 2-1: SIB1 of the corresponding cell does not include the first information related to the extended discontinuous reception 2-2: SIB1 of the cell includes first information related to extended discontinuous reception, and extended discontinuous reception is not configured for UE (that is, neither the second discontinuous reception value nor the fourth discontinuous reception value is configured for UE)

2-3: SIB1 of the corresponding cell includes first information related to extended discontinuous reception, and extended discontinuous reception is configured for UE (that is, at least one of the second discontinuous reception value and the fourth discontinuous reception value is configured for UE, or at least one of the extended discontinuous reception cycle configured by the core network and the extended discontinuous reception cycle configured by the RAN is configured), and the configured discontinuous reception value is equal to or shorter than the modification cycle.

If both 1 and 2-1 are satisfied, or both 1 and 2-2 are satisfied, or both 1 and 2-3 are satisfied, the first condition set is satisfied. Alternatively, if only condition 1 is satisfied without considering 2-1, 2-2, and 2-3, it may be considered that the first condition set is satisfied. In this case, UE using the extended discontinuous reception cycle leads to the result of unnecessarily acquiring the system information once more.

<Second Condition Set>

1: Receive a Short Message with bit 4 set to 1.

2: SIB1 of the corresponding cell includes first information related to extended discontinuous reception, extended discontinuous reception is configured for UE, and the set extended discontinuous reception value is longer than the modification cycle.

If both 1 and 2 are satisfied, the second set of conditions is satisfied.

That the extended discontinuous reception is configured for UE may mean that the second discontinuous reception value is configured for UE or that the extended discontinuous reception cycle is configured by the core network. Or, that extended discontinuous reception is configured for UE means that one of second discontinuous reception value and fourth discontinuous reception value is configured for UE, or that one of the extended discontinuous reception cycle by the core network and the extended discontinuous reception cycle by the RAN It could mean that it has been set.

That the configured discontinuous reception value is equal to or shorter than the modification cycle may mean that the length of the second discontinuous reception value or the extended discontinuous cycle configured by the core network is the same as or shorter than the modification cycle.

If both the second discontinuous reception value and the fourth discontinuous reception value are set, the fact that the configured discontinuous reception value is equal to or shorter than the modification cycle means that at least one of the second discontinuous reception value and the fourth discontinuous reception value is equal to or shorter than the modification cycle.

That the configured discontinuous reception value is longer than the modification cycle may mean that the length of the second discontinuous reception value or the extended discontinuous cycle configured by the core network is longer than the modification cycle. If both the second discontinuous reception value and the fourth discontinuous reception value are configured, the configured discontinuous reception value longer than the modification cycle means that both the second discontinuous reception value and the fourth discontinuous reception value are longer than the modification cycle.

The first information related to extended discontinuous reception may be an indicator indicating that extended discontinuous reception is allowed. Alternatively, it may be an integer indicating the hyperframe number.

The hyperframe number is an integer between 0 and 1023 and has a length of 10 bits. One hyperframe consists of 1024 system frames between SFN0 and SFN1023. SIB1 includes information indicating a system frame number and a hyperplay number. Hyperframes exist continuously.

The modification cycle has a length multiplied by the default paging cycle by the modification cycle parameter. The modification cycle exists continuously, and the radio frame at which each modification cycle starts is an SFN whose value obtained by modulo operation with the modification cycle length is 0.

The extended discontinuous reception acquisition cycle consists of 1024 hyperframes. The length of the hyperframe is 10.24 seconds, and the length of the extended discontinuous reception acquisition cycle is 10485.76 seconds. The hyperframe at which the extended discontinuous reception acquisition cycle starts is a hyperframe number with a value of 0 obtained by modulo operation with 1024.

When the first condition set or the second condition set is satisfied, UE proceeds to steps 3C-05 at the beginning of the next modification cycle or the beginning of the next extended discontinuous reception acquisition cycle.

In step 3C-05, UE applies the system information acquisition procedure.

<System Information Acquisition Procedure>

1: Applying the specified BCCH configuration. For the specified BCCH configuration, SDAP configuration is not used, PDCP configuration is not used, and RLC configuration is transparent mode.

2: Acquire the MIB. MIB includes SIB1 scheduling information.

3: Acquire the SIB1. SIB1 includes mapping information between SI and SIB and scheduling information of SI.

4: Acquire SI messages

5: SI request on demand (request on demand system information). UE requests SI that is not broadcast from the base station.

Figure 4:
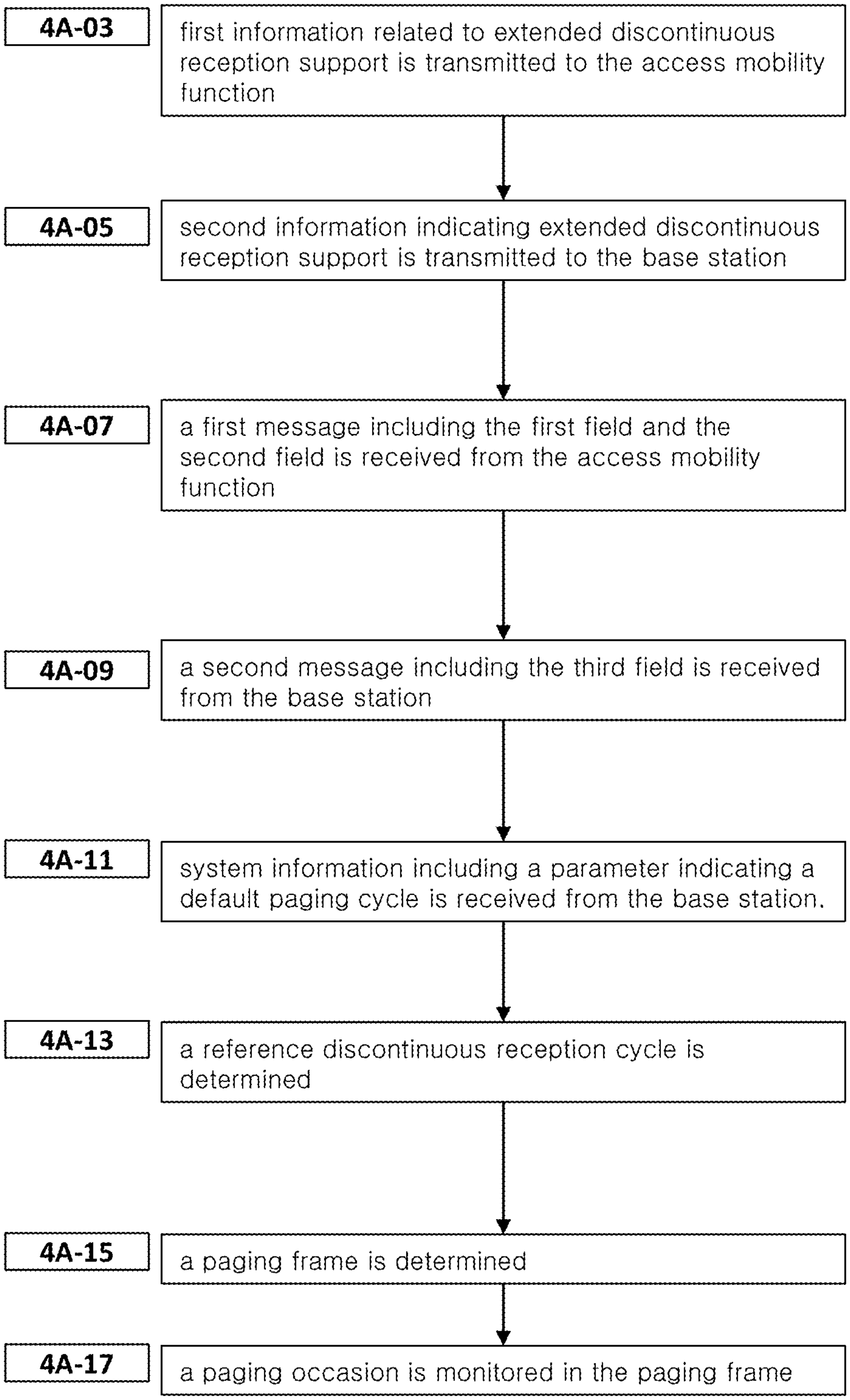
FIG. 4 is a flow diagram illustrating an operation of a terminal.

FIG. 4 is a diagram illustrating an operation of a terminal.

In step 4A-03, first information related to extended discontinuous reception support is transmitted to the access mobility function.

In step 4A-05, second information indicating extended discontinuous reception support is transmitted to the base station.

In step 4A-07, a first message including the first field and the second field is received from the access mobility function.

In step 4A-09, a second message including the third field is received from the base station.

In step 4A-11, system information including a parameter indicating a default paging cycle is received from the base station.

In step 4A-13, a reference discontinuous reception cycle is determined.

In step 4A-15, a paging frame is determined based on the reference discontinuous reception cycle.

In step 4A-17, a paging occasion is monitored in the paging frame.

When the paging transmission window is not used, the terminal determines the reference discontinuous reception cycle as follows.

If the second field indicates a value corresponding to 5.12 seconds or 10.24 seconds, the second terminal-specific discontinuous reception value is a specific value, and the second terminal-specific discontinuous reception value is determined by the third field, the terminal A reference discontinuous reception cycle is determined based on the discontinuous reception value, the second terminal-specific discontinuous reception value, and the default paging cycle.

If the second field indicates a value corresponding to 5.12 seconds or 10.24 seconds, the second terminal-specific discontinuous reception value is a specific value, and the second terminal-specific discontinuous reception value is determined by the fourth field, the terminal A reference discontinuous reception cycle is determined based on the reception value.

When the paging transmission window is used, the terminal determines the reference discontinuous reception cycle as follows.

If the second field indicates a value exceeding 10.24 seconds, the second terminal-specific discontinuous reception value is a specific value, and the second terminal-specific discontinuous reception value is determined by the third field, the terminal determines in the paging transmission window the reference discontinuous reception cycle based on the value indicated in the first field and the value indicated in the third field and the default paging cycle, and the terminal determines outside of paging transmission window the reference discontinuous reception cycle based on the value indicated in the third field and the default paging cycle.

If the second field indicates a value exceeding 10.24 seconds, the second terminal-specific discontinuous reception value is a specific value, and the second terminal-specific discontinuous reception value is determined by the fourth field, the terminal determines in the paging transmission window the reference discontinuous reception cycle based on the value indicated in the first field and the value indicated in the fourth field and the default paging cycle, and the terminal determines outside of paging transmission window the reference discontinuous reception cycle based on the value indicated in the fourth field.

The specific value is a value corresponding to 256 radio frames. The first terminal-specific discontinuous reception value is determined based on the first field and the second field. The second terminal-specific discontinuous reception value is determined by the fourth field when the second message includes the fourth field, and is determined by the third field when the second message does not include the fourth field.

The first field indicates a value of a first set that is a set of predetermined values and the second field indicates a value of a second set that is a set of predetermined values and the predefined values of the first set and the predefined values of the second set are mutually exclusive.

The third field indicates a value of a third set that is a set of predetermined values, and the fourth field indicates a value of a fourth set that is a set of predetermined values, wherein both the third set and the fourth set Including the specific value. The specific value is the highest value of the third set and the lowest value of the fourth set.

The second terminal-specific discontinuous reception value is a discontinuous reception cycle set by the RAN, and the first terminal-specific discontinuous reception value is a discontinuous reception cycle set by the core network.

The fourth field corresponds to a RAN configured extension discontinuous reception cycle.

Figure 5A:
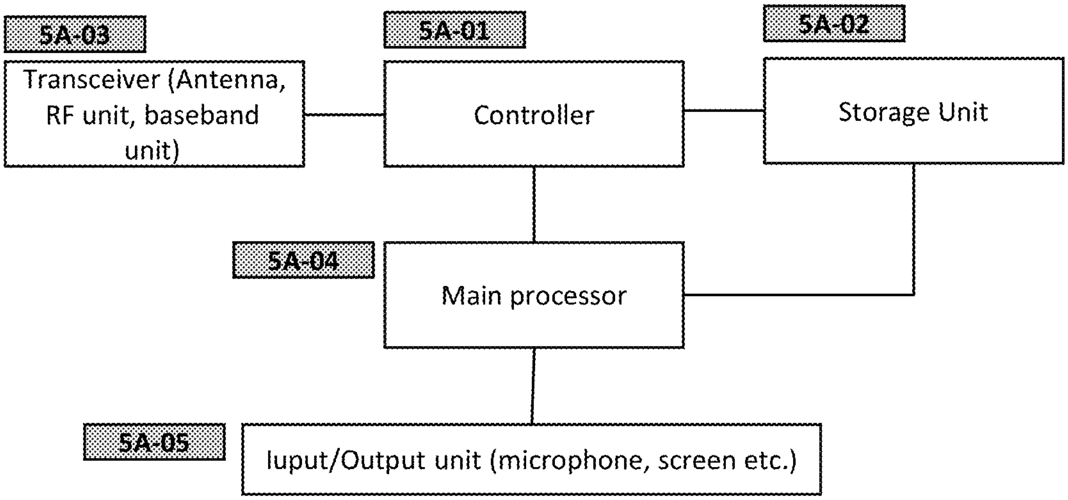
FIG. 5A is a block diagram illustrating the internal structure of a UE to which the disclosure is applied.

FIG. 5A is a block diagram illustrating the internal structure of a UE to which the disclosure is applied.

Referring to the diagram, the UE includes a controller 5A-01, a storage unit 5A-02, a transceiver 5A-03, a main processor 5A-04 and I/O unit 5A-05.

The controller 5A-01 controls the overall operations of the UE in terms of mobile communication. For example, the controller 5A-01 receives/transmits signals through the transceiver 5A-03. In addition, the controller 5A-01 writes and reads data in the storage unit 5A-02. To this end, the controller 5A-01 includes at least one processor. For example, the controller 5A-01 may include a communication processor CP that performs control for communication and an application processor AP that controls the upper layer, such as an application program. The controller controls storage unit and transceiver such that UE operations illustrated in FIG. 3A and FIG. 3B and FIG. 3C and FIG. 4 are performed.

The storage unit 5A-02 stores data for operation of the UE, such as a basic program, an application program, and configuration information. The storage unit 5A-02 provides stored data at a request of the controller 5A-01.

The transceiver 5A-03 consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a digital—to—analog converter DAC, an analog—to—digital converter ADC, and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A-04 controls the overall operations other than mobile operation. The main processor 5A-04 process user input received from I/O unit 5A-05, stores data in the storage unit 5A-02, controls the controller 5A-01 for required mobile communication operations and forward user data to I/O unit 905.

I/O unit 5A-05 consists of equipment for inputting user data and for outputting user data such as a microphone and a screen. I/O unit 5A-05 performs inputting and outputting user data based on the main processor's instruction.

Figure 5B:
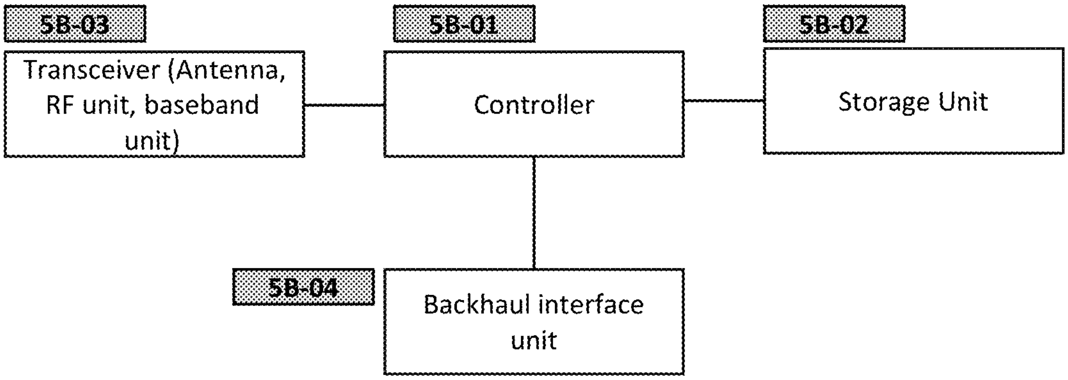
FIG. 5B is a block diagram illustrating the configuration of a base station according to the disclosure.

FIG. 5B is a block diagram illustrating the configuration of a base station according to the disclosure.

As illustrated in the diagram, the base station includes a controller 5B-01, a storage unit 5B-02, a transceiver 5B-03 and a backhaul interface unit 5B-04.

The controller 5B-01 controls the overall operations of the main base station. For example, the controller 5B-01 receives/transmits signals through the transceiver 5B-03, or through the backhaul interface unit 5B-04. In addition, the controller 5B-01 records and reads data in the storage unit 5B-02. To this end, the controller 5B-01 may include at least one processor. The controller controls transceiver, storage unit and backhaul interface such that base station operation illustrated in FIG. 3A and FIG. 3B and FIG. 3C are performed.

The storage unit 5B-02 stores data for operation of the main base station, such as a basic program, an application program, and configuration information. Particularly, the storage unit 5B-02 may store information regarding a bearer allocated to an accessed UE, a measurement result reported from the accessed UE, and the like. In addition, the storage unit 5B-02 may store information serving as a criterion to deter mine whether to provide the UE with multi-connection or to discontinue the same. In addition, the storage unit 5B-02 provides stored data at a request of the controller 5B-01.

The transceiver 5B-03 consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 5B-04 provides an interface for communicating with other nodes inside the network. The backhaul interface unit 5B-04 converts a bit string transmitted from the base station to another node, for example, another base station or a core network, into a physical signal, and converts a physical signal received from the other node into a bit string.

What is claimed is:

1. A method by a terminal in a wireless communication system, the method comprising:

receiving from an Access Mobility Function (AMF) a first message comprising a first discontinuous reception cycle and a second discontinuous reception cycle;

receiving from a base station a second message comprising a third discontinuous reception cycle and a fourth discontinuous reception cycle;

receiving in a first cell a system information comprising a default paging cycle;

determining a reference discontinuous reception cycle;

determining a paging frame based on the reference discontinuous reception cycle; and monitoring in the first cell a paging occasion in the paging frame, wherein the reference discontinuous reception cycle is determined:

based on the first discontinuous reception cycle, the third discontinuous reception cycle, and the default paging cycle in case that a first information related to extended discontinuous reception is not comprised in the system information; and based on the fourth discontinuous reception cycle in case that the first information related to extended discontinuous reception is comprised in the system information.

2. The method of claim 1, wherein the first information indicates whether extended discontinuous reception is allowed in the first cell.

3. The method of claim 1, wherein the terminal ignores the third discontinuous reception cycle if the fourth discontinuous reception cycle and the third discontinuous reception cycle are comprised in the second message.

4. The method of claim 1, the method further comprising:

transmitting to the base station a message comprising information indicating whether the terminal supports extended discontinuous reception in an inactive state.

5. A terminal in a wireless communication system, the terminal comprising:

a transceiver configured to transmit and receive a signal; and a controller configured to control the transceiver to:

receive from an Access Mobility Function (AMF) a first message comprising a first discontinuous reception cycle and a second discontinuous reception cycle;

receive from a base station a second message comprising a third discontinuous reception cycle and a fourth discontinuous reception cycle;

receive in a first cell a system information comprising a default paging cycle;

determine a reference discontinuous reception cycle;

determine a paging frame based on the reference discontinuous reception cycle; and monitor in the first cell a paging occasion in the paging frame, wherein the reference discontinuous reception cycle is determined:

based on the first discontinuous reception cycle, the third discontinuous reception cycle, and the default paging cycle in case that a first information related to extended discontinuous reception is not comprised in the system information; and based on the fourth discontinuous reception cycle in case that the first information related to extended discontinuous reception is comprised in the system information.

* * * * *

UNITED STATES PATENT AND TRADEMARK OFFICE

CERTIFICATE OF CORRECTION

PATENT NO. : 12,207,228 B2
APPLICATION NO. : 17/888476
DATED : January 21, 2025
INVENTOR(S) : Soenghun Kim It is certified that error appears in the above-identified patent and that said Letters Patent is hereby corrected as shown below:

On the Title Page

Insert --Foreign Application Priority Data
October 18, 2021 (KR)..................... 10-2021-0138362--

Signed and Sealed this
Twenty-fifth Day of February, 2025

Coke Morgan Stewart
*Acting Director of the United States Patent and Trademark Office*